US012795395B2

(12) United States Patent
Gan et al.

(10) Patent No.: US 12,795,395 B2
(45) Date of Patent: Nov. 10, 2026

(54) CRITICAL BSS PARAMETER MANAGEMENT METHOD APPLICABLE TO MULTIPLE LINK AND RELATED APPARATUS

(71) Applicant: HUAWEI TECHNOLOGIES CO., LTD., Shenzhen (CN)

(72) Inventors: Ming Gan, Shenzhen (CN); Jian Yu, Shenzhen (CN); Yunbo Li, Shenzhen (CN); Yuchen Guo, Shenzhen (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/148,876

(22) Filed: Dec. 30, 2022

(65) Prior Publication Data

US 2023/0156492 A1 May 18, 2023

Related U.S. Application Data

(63) Continuation of application No. PCT/CN2021/112621, filed on Aug. 13, 2021.

(30) Foreign Application Priority Data

Aug. 14, 2020 (CN) ......................... 202010821468.2

(51) Int. Cl.
*H04W 24/02* (2009.01)
*H04W 48/08* (2009.01)
(Continued)

(52) U.S. Cl.
CPC ........... *H04W 24/02* (2013.01); *H04W 48/08* (2013.01); *H04W 76/15* (2018.02); *H04W 76/20* (2018.02); *H04W 84/12* (2013.01)

(58) Field of Classification Search
None
See application file for complete search history.

(56) References Cited

U.S. PATENT DOCUMENTS

2015/0282056 A1* 10/2015 Cherian ................ H04W 48/08
370/328
2019/0253965 A1 8/2019 Gan et al.
(Continued)

FOREIGN PATENT DOCUMENTS

CN 109756956 A 5/2019
CN 109890053 A 6/2019
(Continued)

OTHER PUBLICATIONS

U.S. Appl. No. 63/013,584, filed Apr. 22, 2020 (Year: 2020).*
(Continued)

*Primary Examiner* — Faruk Hamza
*Assistant Examiner* — Cassandra L Decker
(74) *Attorney, Agent, or Firm* — Leydig, Voit & Mayer, Ltd.

(57) ABSTRACT

This application relates to the wireless communication field, and in particular, to critical basic service set (BSS) parameter management methods and apparatus applicable to multiple links, for example, in a wireless local area network supporting the 802.11be standard. In an example method includes, a first access point (AP) in a first access point multi-link device (AP MLD) generates and sends a first frame. The first frame indicates critical BSS parameter update count values corresponding to a plurality of APs in the first AP MLD and critical BSS parameter update count values corresponding to a plurality of APs in a second AP MLD. The second AP MLD is an AP MLD to which a
(Continued)

nontransmitted AP belongs. The nontransmitted AP is in a multiple basic service set identifier (BSSID) set including the first AP.

19 Claims, 16 Drawing Sheets

(51) Int. Cl.
*H04W 76/15* (2018.01)
*H04W 76/20* (2018.01)
*H04W 84/12* (2009.01)

(56) References Cited

U.S. PATENT DOCUMENTS

| | | | | |
|---|---|---|---|---|
| 2019/0268956 | A1 | 8/2019 | Xiao et al. | |
| 2020/0137651 | A1* | 4/2020 | Cariou | H04W 36/08 |
| 2020/0163141 | A1 | 5/2020 | Hsu et al. | |
| 2020/0213933 | A1 | 7/2020 | Patil et al. | |
| 2020/0280910 | A1* | 9/2020 | Lee | H04L 12/12 |
| 2020/0404737 | A1* | 12/2020 | Cariou | H04W 48/14 |
| 2021/0014776 | A1* | 1/2021 | Patil | H04W 72/0446 |
| 2021/0014911 | A1* | 1/2021 | Patil | H04W 12/73 |
| 2021/0051574 | A1* | 2/2021 | Chu | H04W 84/18 |
| 2021/0120599 | A1* | 4/2021 | Cariou | H04W 88/08 |
| 2021/0250848 | A1* | 8/2021 | Seok | H04W 36/06 |
| 2021/0274500 | A1* | 9/2021 | Cariou | H04W 72/0453 |
| 2021/0274574 | A1* | 9/2021 | Ghosh | H04W 48/12 |
| 2021/0282229 | A1* | 9/2021 | Stacey | H04W 88/10 |
| 2021/0321243 | A1* | 10/2021 | Patil | H04W 76/15 |
| 2021/0321410 | A1* | 10/2021 | Patil | H04W 76/19 |
| 2021/0337613 | A1* | 10/2021 | Seok | H04W 48/16 |
| 2021/0392571 | A1* | 12/2021 | Kneckt | H04W 48/10 |
| 2023/0103810 | A1* | 4/2023 | Kim | H04W 76/15 370/329 |
| 2023/0164859 | A1* | 5/2023 | Jang | H04L 69/14 370/328 |
| 2023/0232315 | A1* | 7/2023 | Chitrakar | H04W 48/16 370/329 |
| 2023/0354187 | A1* | 11/2023 | Kim | H04W 76/15 |

FOREIGN PATENT DOCUMENTS

| | | | | |
|---|---|---|---|---|
| CN | 110418404 | A | 11/2019 | |
| CN | 110831215 | A | 2/2020 | |
| CN | 111345063 | A | 6/2020 | |
| CN | 114079941 | A | 2/2022 | |
| CN | 116017508 | A | 4/2023 | |
| EP | 3866512 | A1 | 8/2021 | |
| RU | 2721747 | C2 | 5/2020 | |
| WO | 2019169094 | A1 | 9/2019 | |
| WO | 2020022814 | A1 | 1/2020 | |
| WO | 2020040587 | A1 | 2/2020 | |
| WO | 2020091331 | A1 | 5/2020 | |
| WO | 2020091332 | A1 | 5/2020 | |
| WO | WO-2021262092 | A1 * | 12/2021 | H04L 12/4641 |

OTHER PUBLICATIONS

U.S. Appl. No. 63/026,289, filed 2020.*

Gan et al., "BSS parameter update for Multi-link Operation," IEEE 802.11-20/0503-02-00be, Total 14 pages, Institute of Electrical and Electronics Engineers, New York, New York (Apr. 1, 2020).

Khorov et al., "Current Status and Directions of IEEE 802.11be, the Future Wi-Fi 7," IEEE Access (vol. 8), Total 25 pages, Institute of Electrical and Electronics Engineers, New York, New York (accepted May 1, 2020, date of publication May 8, 2020, date of current version May 21, 2020).

IEEE P802.11ax/D6.0, Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 1: Engancement for High Efficiency WLAN, Total 780 pages, , Institute of Electrical and Electronics Engineers, New York, New York (Nov. 2019).

Gan et al., "Multiple BSSID for Multi-link Operation," IEEE 802.11-20/0557-01-00be, Total 10 pages, Institute of Electrical and Electronics Engineers, New York, New York, (May 10, 2020).

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11-2016, Institute of Electrical and Electronics Engineers, New York, New York, Total 3534 pages (Approved Dec. 7, 2016).

Kim et al., "Minutes for TGbe MAC Ad-Hoc teleconferences in Jul. and Sep. 2020," IEEE P802.11 Wireless LANS, doc.: IEEE 802. 11-20/1079r9, Total 56 pages, XP068170512 (Jul. 2020).

Patil et al., "MLO Indication of Critical Updates," doc.: IEEE 802.11-20/0586r5, Total 19 pages, XP068172924 (Apr. 2020).

Chu et al., "MLO BSS Information Transmission and Multiple BSSID Support," IEEE 802.11-20/0396r5, Total 11 pages, Institute of Electrical Electronics Engineers, New York, New York (Mar. 1, 2020).

Cariou et al., "Multi-link discovery—part 1," Intel, IEEE 802.11-20/0389r3, Internet URL: https://mentor.ieee.org/802.11/dcn/20/11-20-0389-03-00be-multi-link-discovery-part-1.pptx>, Jul. 17, 2020 Total 15 pages (Feb. 2020).

Patil et al., "Container for advertising ML Information," Qualcomm Inc., IEEE 802.11-20/0357r0, Internet URL: https://mentor.ieee.org/802.11/dcn/20/11-20-0357-00-00be-mlo-container-structure-for-capability-advertisement.pptx>, Total 28 pages, Institute of Electrical Electronics Engineers, New York, New York (Mar. 15, 2020).

Patil, "Container for Advertising ML Information," Qualcomm, IEEE 802.11-20/0357r4, total 30 pages (Mar. 15, 2020).

* cited by examiner

AP MLD: access point multi-link device
Non-AP MLD: non-access point multi-link device
MAC: medium access control
PHY: physical layer

| Element ID | Length | Maximum BSSID indication | Optional subelement |
|---|---|---|---|
| 1 byte | 1 byte | 6 bytes | Variable |

Element ID: element identifier
BSSID: basic service set identifier

| | Element ID Element identifier | Length Length | Channel Switch Mode Channel switch mode | New Channel Number New channel number | Channel Switch Count Channel switch count |
|---|---|---|---|---|---|
| Byte | 1 | 1 | 1 | 1 | 1 |

FIG. 11a

| | Element ID Element identifier | Length Length | Channel Switch Mode Channel switch mode | New Operating Class New operating class | New Channel Number New channel number | Channel Switch Count Channel switch count |
|---|---|---|---|---|---|---|
| Byte | 1 | 1 | 1 | 1 | 1 | 1 |

FIG. 11b

| | Element ID Element identifier | Length Length | New Channel Width New channel bandwidth | New Channel Center Frequency Segment 0 (new channel center frequency segment 0) | New Channel Center Frequency Segment 1 (new channel center frequency segment 1) |
|---|---|---|---|---|---|
| Byte | 1 | 1 | 1 | 1 | 1 |

FIG. 11c

| | Element ID Element identifier | Length Length | Quiet Count Quiet count | Quiet Period Quiet period | Quiet Duration Quiet duration | Quiet Offset Quiet offset |
|---|---|---|---|---|---|---|
| Byte | 1 | 1 | 1 | 1 | 1 | 1 |

FIG. 11d

| | Element ID Element identifier | Length Length | Element ID extension Element identifier extension | List of element IDs List of element identifiers | List of element ID Extension List of element identifier extension |
|---|---|---|---|---|---|
| Byte | 1 | 1 | 1 | 1 or more | 1 or more |
FIG. 12
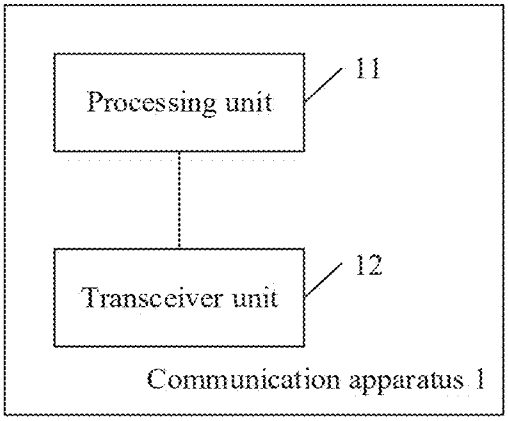
FIG. 13
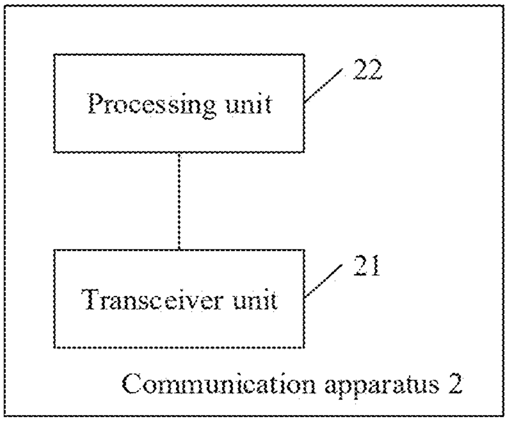
FIG. 14

CRITICAL BSS PARAMETER MANAGEMENT METHOD APPLICABLE TO MULTIPLE LINK AND RELATED APPARATUS

CROSS-REFERENCE TO RELATED APPLICATIONS

This application is a continuation of International Application No. PCT/CN2021/112621, filed on Aug. 13, 2021, which claims priority to Chinese Patent Application No. 202010821468.2, filed on Aug. 14, 2020. The disclosures of the aforementioned applications are hereby incorporated by reference in their entireties.

TECHNICAL FIELD

This application relates to the field of wireless communication technologies, and in particular, to a critical BSS parameter management method applicable to multiple links and a related apparatus.

BACKGROUND

To greatly increase a service transmission rate of a wireless local area network (wireless local area network, WLAN) system, an orthogonal frequency division multiple access (OFDMA, Orthogonal Frequency Division Multiple access) technology is further used in the Institute of Electrical and Electronics Engineers (IEEE, Institute of Electrical and Electronics Engineers) 802.11ax standard based on an existing orthogonal frequency division multiplexing (OFDM, Orthogonal Frequency Division Multiplexing) technology. The OFDMA technology supports a plurality of nodes to simultaneously send and receive data. This achieves multi-station diversity gains.

The next-generation Wi-Fi standard, IEEE 802.11be, is referred to as extremely high throughput (extremely high throughput, EHT) or Wi-Fi 7, and its most important technical goal is to significantly improve a peak throughput. An IEEE 802.11be-compliant WLAN device can improve a peak throughput and reduce a service transmission delay by using a plurality of streams (a maximum of 16 spatial streams), a plurality of frequency bands (for example, 2.4 GHz, 5 GHz, and 6 GHz frequency bands), and through cooperation of a plurality of channels in a same frequency band. The plurality of frequency bands or plurality of channels may be collectively referred to as multiple links. A next-generation IEEE 802.11-compliant station device that simultaneously supports multiple links is referred to as a multi-link device (multi-link device, MLD) herein.

When a BSS of an AP in an access point multi-link device (access point MLD, AP MLD) is updated, some station multi-link devices or stations may fail to obtain latest information of BSSs managed by these APs. Consequently, these station multi-link devices or stations cannot normally communicate with these special APs.

SUMMARY

Embodiments of this application provide a critical BSS parameter management method applicable to multiple links and a related apparatus, to help some APs or all APs in some AP MLDs notify STAs managed by the APs (managed BSSs) whether critical BSS parameters of the APs are updated, to assist the STA in receiving a latest critical BSS parameter. Therefore, the STA can also normally communicate with the AP after the critical BSS parameter of the AP is updated.

The following describes this application from different aspects. It should be understood that mutual reference may be made to the following implementations and beneficial effects of the different aspects.

According to a first aspect, this application provides a BSS parameter management method applicable to multiple links, applied to a first AP MLD, where a first AP is any reporting AP in the first AP MLD. The BSS parameter management method applicable to multiple links includes: The first AP in the first AP MLD generates a first frame, and sends the first frame on a link on which the first AP works. The first frame indicates critical basic service set (BSS) parameter update information respectively corresponding to a plurality of APs in the first AP MLD and critical BSS parameter update information respectively corresponding to a plurality of APs in a second AP MLD. The second AP MLD is an AP MLD to which a nontransmitted AP belongs in a multiple basic service set identifier BSSID set including the first AP, and one piece of critical BSS parameter update information corresponding to an AP is used to determine whether a critical BSS parameter in a BSS managed by the AP is updated.

Optionally, the critical BSS parameter update information includes a critical BSS parameter update count value.

Optionally, the critical BSS parameter update count value is increased by 1 when one or more parameters of critical BSS parameters change/changes.

In this solution, by using the first frame, not only critical BSS parameter update count values corresponding to the plurality of APs in the first AP MLD, but also critical BSS parameter update count values corresponding to the plurality of APs in the second AP MLD are indicated. This implements that one AP helps a plurality of APs in another AP MLD to indicate corresponding critical BSS parameter update count values, so that a STA can compare a currently received critical BSS parameter update count value with a critical BSS parameter update count value received last time, and check whether a critical BSS parameter is updated. Therefore, the STA can be assisted in receiving a latest critical BSS parameter, and a non-AP MLD associated with the second AP MLD can listen on a link on which a nontransmitted AP in the second AP MLD works, and can also work normally. In other words, for the non-AP MLD, there may be more to-be-listened channels for selection. In 802.11be, it is possible that all or some APs in an AP MLD are nontransmitted APs. Therefore, the solution provided in this embodiment of this application can resolve a problem that some nontransmitted APs cannot send a management frame to notify that a critical BSS parameter is updated. Therefore, integrity and diversity of a critical BSS parameter update indication can be improved.

With reference to the first aspect, in a possible implementation, after the first AP in the first AP MLD sends the first frame, the method further includes: the first AP in the first AP MLD generates a second frame, where the second frame indicates specific critical BSS parameters of a plurality of APs in the first AP MLD and specific critical BSS parameters of a plurality of APs in the second AP MLD; and sends the second frame on the link on which the first AP works.

This solution can not only help some APs in another AP MLD indicate whether a critical BSS parameter is updated, but also help some APs in the another AP MLD indicate a latest specific critical BSS parameter. The specific critical BSS parameter includes an element related to a channel change. This may help the non-AP MLD learn working channel switching statuses of all APs in the AP MLD in time when the non-AP MLD listens to one or more links (not all the links), so that the non-AP MLD can work normally.

According to a second aspect, this application provides a BSS parameter management method applicable to multiple links, and the method is applied to a first STA. The first STA may be a single-link STA, or may be a STA in a non-AP MLD. The first STA and a first AP work on one link. The BSS parameter management method applicable to multiple links includes: the first STA of the non-AP MLD receives a first frame on a link on which the first STA works, and determines, based on the first frame, whether critical BSS parameters of a plurality of BSSs managed by a plurality of APs in an AP MLD associated with the first STA are updated. The first frame indicates critical BSS parameter update information respectively corresponding to a plurality of APs in the first AP MLD and critical BSS parameter update information respectively corresponding to a plurality of APs in a second AP MLD. The second AP MLD is an AP MLD to which a nontransmitted AP belongs in a multiple BSSID set including the first AP. One piece of critical BSS parameter update information corresponding to an AP is used to determine whether a critical BSS parameter in a BSS managed by the AP is updated.

It may be understood that, when the first STA is a STA in the non-AP MLD, the AP MLD associated with the first STA may be an AP MLD associated with the non-AP MLD including the first STA.

Optionally, the critical BSS parameter update information includes a critical BSS parameter update count value.

Optionally, the critical BSS parameter update count value is increased by 1 when one or more parameters of critical BSS parameters change/changes.

With reference to the second aspect, in a possible implementation, after the first STA of the non-AP MLD receives the first frame, the method further includes: The first STA of the non-AP MLD receives a second frame on a link on which the first STA works, where the second frame indicates specific critical BSS parameters of a plurality of APs in the first AP MLD and specific critical BSS parameters of a plurality of APs in the second AP MLD; and parses the second frame to obtain specific critical BSS parameters of a plurality of APs in an AP MLD associated with the non-AP MLD.

According to a third aspect, this application provides a communication apparatus. The communication apparatus may be a first AP MLD or a chip in a first AP MLD, for example, a Wi-Fi chip, or may be a first AP in a first AP MLD or a chip in a first AP, and includes:

- a processing unit, configured to generate a first frame, where the first frame indicates critical basic service set (BSS) parameter update information respectively corresponding to a plurality of APs in a first AP MLD and critical BSS parameter update information respectively corresponding to a plurality of APs in a second AP MLD, the second AP MLD is an AP MLD to which a nontransmitted AP belongs in a multiple basic service set identifier BSSID set including a first AP, and one piece of critical BSS parameter update information corresponding to an AP is used to determine whether a critical BSS parameter in a BSS managed by the AP is updated; and a transceiver unit, configured to send the first frame on a link on which the communication apparatus works.

Optionally, the critical BSS parameter update information includes a critical BSS parameter update count value.

Optionally, the critical BSS parameter update count value is increased by 1 when one or more parameters of critical BSS parameters change/changes.

With reference to the third aspect, in a possible implementation, the processing unit is further configured to generate a second frame, where the second frame indicates specific critical BSS parameters of a plurality of APs in the first AP MLD and specific critical BSS parameters of a plurality of APs in the second AP MLD. The transceiver unit is further configured to send the second frame on a link on which the communication apparatus works.

According to a fourth aspect, this application provides a communication apparatus. The communication apparatus may be a first STA or a chip in a first STA, for example, a Wi-Fi chip. The first STA may be a single-link STA, or may be a STA in a non-AP MLD. The communication apparatus includes:

- a transceiver unit, configured receive a first frame on a link on which the communication apparatus works, where the first frame indicates critical BSS parameter update information respectively corresponding to a plurality of APs in the first AP MLD and critical BSS parameter update information respectively corresponding to a plurality of APs in a second AP MLD, the second AP MLD is an AP MLD to which a nontransmitted AP belongs in a multiple BSSID set including the first AP, and one piece of critical BSS parameter update information corresponding to an AP is used to determine whether a critical BSS parameter in a BSS managed by the AP is updated; and a processing unit, configured to determine, based on the first frame, whether critical BSS parameters of a plurality of BSSs managed by a plurality of APs in an AP MLD associated with the communication apparatus are updated.

Optionally, the critical BSS parameter update information includes a critical BSS parameter update count value.

Optionally, the critical BSS parameter update count value is increased by 1 when one or more parameters of critical BSS parameters change/changes.

With reference to the fourth aspect, in a possible implementation, the transceiver unit is further configured to receive a second frame on a link on which the communication apparatus works, where the second frame indicates specific critical BSS parameters of a plurality of APs in the first AP MLD and specific critical BSS parameters of a plurality of APs in the second AP MLD. The processing unit is configured to parse the second frame to obtain specific critical BSS parameters of a plurality of APs in an AP MLD associated with the non-AP MLD.

In an implementation of any one of the foregoing aspects, the first frame includes a link identifier field and a multi-link device MLD identifier field. The link identifier field indicates a reported AP. The MLD identifier field indicates an AP MLD including the reported AP.

Optionally, the first frame further includes a critical BSS parameter count field, and the critical BSS parameter update count value field indicates the critical BSS parameter update count value.

In an implementation of any one of the foregoing aspects, the critical BSS parameter update count value field, the link identifier field, and the MLD identifier field are carried in a reduced neighbor report RNR element of the first frame.

It may be understood that the three fields: the critical BSS parameter update count value field, the link identifier field, and the MLD identifier field are independent, and may be all carried in the RNR element, or may not be all carried in the RNR element. In other words, the RNR element may carry some of the three fields.

In an implementation of any one of the foregoing aspects, one target beacon transmission time TBTT information field in the RNR element carries one critical BSS parameter update count value, one link identifier field, and one MLD identifier field. One TBTT information field corresponds to one AP.

In an implementation of any one of the foregoing aspects, a value of a short service set identifier SSID field of an AP in the RNR element is obtained based on an SSID of an MLD including the AP.

In an implementation of any one of the foregoing aspects, one specific critical BSS parameter of one AP in the second frame includes one or more of the following: an inclusion of a channel switch announcement element, an inclusion of an extended channel switch announcement element, an inclusion of a wide bandwidth channel switch element, and an inclusion of a channel switch wrapper element.

In an implementation of any one of the foregoing aspects, the foregoing specific critical BSS parameter is carried in a multi-link ML element.

According to a fifth aspect, this application provides a method for updating a critical BSS parameter, applied to a first AP MLD, where a second AP is any AP in the first AP MLD. The method for updating the critical BSS parameter includes: the second AP in the first AP MLD generates a second frame, and sends the second frame on a link on which the second AP works. The second frame indicates specific critical BSS parameters of a plurality of APs in the first AP MLD and/or specific critical BSS parameters of a plurality of APs in the second AP MLD. The second AP MLD is an AP MLD to which a nontransmitted AP belongs in a multiple BSSID set including the second AP Optionally, one specific critical BSS parameter of one AP in the second frame includes one or more of the following: an inclusion of a channel switch announcement element, an inclusion of an extended channel switch announcement element, an inclusion of a wide bandwidth channel switch element, and an inclusion of a channel switch wrapper element.

Optionally, the specific critical BSS parameter is carried in a multi-link ML element.

According to a sixth aspect, this application provides a method for updating a critical BSS parameter, applied to a second STA, where the second STA may be a single-link STA, or may be a STA in a non-AP MLD. The second STA and a second AP work on one link. The method for updating the critical BSS parameter includes: the second STA receives a second frame on a link on which the second STA works, and parses the second frame to obtain specific critical BSS parameters of a plurality of APs in an AP MLD associated with the second STA. The second frame indicates specific critical BSS parameters of a plurality of APs in the first AP MLD and/or specific critical BSS parameters of a plurality of APs in the second AP MLD. The second AP MLD is an AP MLD to which a nontransmitted AP belongs in a multiple BSSID set including the second AP It may be understood that when the second STA is a STA in the non-AP MLD, the AP MLD associated with the second STA may be an AP MLD associated with the non-AP MLD including the second STA.

Optionally, one specific critical BSS parameter of one AP in the second frame includes one or more of the following: an inclusion of a channel switch announcement element, an inclusion of an extended channel switch announcement element, an inclusion of a wide bandwidth channel switch element, and an inclusion of a channel switch wrapper element.

Optionally, the specific critical BSS parameter is carried in a multi-link ML element.

According to a seventh aspect, this application provides a communication apparatus. The communication apparatus may be a first AP MLD or a chip in a first AP MLD, for example, a Wi-Fi chip, or may be a second AP in a first AP MLD or a chip in a second AP, and includes:

a processing unit, configured to generate a second frame, where the second frame indicates specific critical BSS parameters of a plurality of APs in the first AP MLD and/or specific critical BSS parameters of a plurality of APs in the second AP MLD, and the second AP MLD is an AP MLD to which a nontransmitted AP belongs in a multiple BSSID set including the second AP; and a transceiver unit, configured to send the second frame on a link on which the communication apparatus works.

Optionally, one specific critical BSS parameter of one AP in the second frame includes one or more of the following: an inclusion of a channel switch announcement element, an inclusion of an extended channel switch announcement element, an inclusion of a wide bandwidth channel switch element, and an inclusion of a channel switch wrapper element.

Optionally, the specific critical BSS parameter is carried in a multi-link ML element.

According to an eighth aspect, this application provides a communication apparatus. The communication apparatus may be a second STA or a chip in a second STA, for example, a Wi-Fi chip. The first STA may be a single-link STA, or may be a STA in a non-AP MLD. The communication apparatus includes:

a transceiver unit, configured to receive a second frame on a link on which the communication apparatus works, where the second frame indicates specific critical BSS parameters of a plurality of APs in the first AP MLD and/or specific critical BSS parameters of a plurality of APs in the second AP MLD, and the second AP MLD is an AP MLD to which a nontransmitted AP belongs in a multiple BSSID set including the second AP; and a processing unit, configured to parse the second frame to obtain specific critical BSS parameters of a plurality of APs in an AP MLD associated with the non-AP MLD.

Optionally, one specific critical BSS parameter of one AP in the second frame includes one or more of the following: an inclusion of a channel switch announcement element, an inclusion of an extended channel switch announcement element, an inclusion of a wide bandwidth channel switch element, and an inclusion of a channel switch wrapper element.

Optionally, the specific critical BSS parameter is carried in a multi-link ML element.

According to a ninth aspect, this application provides a communication apparatus. The communication apparatus is specifically a first AP MLD or a first AP in a first AP MLD, and includes a processor and a transceiver. The processor is configured to support the first AP MLD in performing a corresponding function in the method in the first aspect. The transceiver is configured to: support communication between the first AP MLD and a non-access point multi-link device (also referred to as a station multi-link device), and send information, a frame, a data packet, instructions, or the like in the foregoing method to the station multi-link device. The first AP MLD may further include a memory. The memory is configured to be coupled to the processor, and the memory stores program instructions and data that are necessary for the first AP MLD.

Specifically, the processor is configured to generate a first frame, where the first frame indicates critical basic service set (BSS) parameter update information respectively corresponding to a plurality of APs in a first AP MLD and critical BSS parameter update information respectively corresponding to a plurality of APs in a second AP MLD. The second AP MLD is an AP MLD to which a nontransmitted AP belongs in a multiple basic service set identifier BSSID set including a first AP, and one piece of critical BSS parameter update information corresponding to an AP is used to determine whether a critical BSS parameter in a BSS managed by the AP is updated. The transceiver is configured to send the first frame on a link on which the communication apparatus works.

According to a tenth aspect, this application provides a communication apparatus. The communication apparatus is specifically a first STA, including a processor and a transceiver. The processor is configured to support the first STA in performing a corresponding function in the method in the second aspect. The transceiver is configured to: support communication between the first STA and a first AP MLD, and receive information, a frame, a data packet, instructions, and the like in the foregoing method from the first AP MLD. The first STA may further include a memory. The memory is configured to be coupled to the processor, and the memory stores program instructions and data that are necessary for the first STA.

Specifically, the transceiver is configured to receive a first frame on a link on which the communication apparatus works, where the first frame indicates critical BSS parameter update information respectively corresponding to a plurality of APs in the first AP MLD and critical BSS parameter update information respectively corresponding to a plurality of APs in a second AP MLD. The second AP MLD is an AP MLD to which a nontransmitted AP belongs in a multiple BSSID set including the first AP, and one piece of critical BSS parameter update information corresponding to an AP is used to determine whether a critical BSS parameter in a BSS managed by the AP is updated. The processor is configured to determine, based on the first frame, whether critical BSS parameters of a plurality of BSSs managed by a plurality of APs in an AP MLD associated with the first STA are updated.

According to an eleventh aspect, this application provides a communication apparatus. The communication apparatus is specifically a first AP MLD or a second AP in a first AP MLD, and includes a processor and a transceiver. The processor is configured to support the first AP MLD in performing a corresponding function in the method in the fifth aspect. The transceiver is configured to: support communication between the first AP MLD and a non-access point multi-link device (also referred to as a station multi-link device), and send information, a frame, a data packet, instructions, or the like in the foregoing method to the station multi-link device. The first AP MLD may further include a memory. The memory is configured to be coupled to the processor, and the memory stores program instructions and data that are necessary for the first AP MLD.

Specifically, the processor is configured to generate a second frame, where the second frame indicates specific critical BSS parameters of a plurality of APs in the first AP MLD and/or specific critical BSS parameters of a plurality of APs in the second AP MLD. The second AP MLD is an AP MLD to which a nontransmitted AP belongs in a multiple BSSID set including the second AP. The transceiver is configured to send the second frame on a link on which the communication apparatus works.

According to a twelfth aspect, this application provides a communication apparatus. The communication apparatus is specifically a second STA, including a processor and a transceiver. The processor is configured to support the second STA in performing a corresponding function in the method in the sixth aspect. The transceiver is configured to: support communication between the second STA and a first AP MLD, and receive information, a frame, a data packet, instructions, and the like in the foregoing method from the first AP MLD. The second STA may further include a memory. The memory is configured to be coupled to the processor, and the memory stores program instructions and data that are necessary for the second STA.

Specifically, the transceiver is configured to receive a second frame on a link on which the communication apparatus works, where the second frame indicates specific critical BSS parameters of a plurality of APs in the first AP MLD and/or specific critical BSS parameters of a plurality of APs in the second AP MLD. The second AP MLD is an AP MLD to which a nontransmitted AP belongs in a multiple BSSID set including the second AP. The processor is configured to parse the second frame to obtain specific critical BSS parameters of a plurality of APs in an AP MLD associated with the second STA.

According to a thirteenth aspect, this application provides a chip or a chip system, including an input/output interface and a processing circuit. Specifically, the processing circuit is configured to generate a first frame, where the first frame indicates critical basic service set (BSS) parameter update information respectively corresponding to a plurality of APs in a first AP MLD and critical BSS parameter update information respectively corresponding to a plurality of APs in a second AP MLD. The second AP MLD is an AP MLD to which a nontransmitted AP belongs in a multiple basic service set identifier BSSID set including a first AP, and one piece of critical BSS parameter update information corresponding to an AP is used to determine whether a critical BSS parameter in a BSS managed by the AP is updated. The input/output interface is configured to send the first frame on a link on which the chip or the chip system works.

In a possible design, the input/output interface is configured to receive a first frame on a link on which the chip or the chip system works, where the first frame indicates critical BSS parameter update information respectively corresponding to a plurality of APs in the first AP MLD and critical BSS parameter update information respectively corresponding to a plurality of APs in a second AP MLD. The second AP MLD is an AP MLD to which a nontransmitted AP belongs in a multiple BSSID set including the first AP, and one piece of critical BSS parameter update information corresponding to an AP is used to determine whether a critical BSS parameter in a BSS managed by the AP is updated. The processing circuit is configured to determine, based on the first frame, whether critical BSS parameters of a plurality of BSSs managed by a plurality of APs in an AP MLD associated with a first STA are updated.

According to a fourteenth aspect, this application provides a chip or a chip system, including an input/output interface and a processing circuit. The processing circuit is configured to generate a second frame, where the second frame indicates specific critical BSS parameters of a plurality of APs in the first AP MLD and/or specific critical BSS parameters of a plurality of APs in the second AP MLD. The second AP MLD is an AP MLD to which a nontransmitted AP belongs in a multiple BSSID set including the second AP. The input/output interface is configured to send the second frame on a link on which the chip or the chip system works.

In a possible design, the input/output interface is configured to receive a second frame on a link on which the chip or the chip system works, where the second frame indicates specific critical BSS parameters of a plurality of APs in the first AP MLD and/or specific critical BSS parameters of a plurality of APs in the second AP MLD. The second AP MLD is an AP MLD to which a nontransmitted AP belongs in a multiple BSSID set including the second AP. The processing circuit is configured to parse the second frame to obtain specific critical BSS parameters of a plurality of APs in an AP MLD associated with the second STA.

According to a fifteenth aspect, this application provides a computer-readable storage medium. The computer-readable storage medium stores instructions. When the instructions are run on a computer, the computer is enabled to perform the critical BSS parameter management method applicable to multiple links according to the first aspect or the second aspect.

According to a sixteenth aspect, this application provides a computer-readable storage medium. The computer-readable storage medium stores instructions. When the instructions are run on a computer, the computer is enabled to perform the method for updating a critical BSS parameter according to the fifth aspect or the sixth aspect.

According to a seventeenth aspect, this application provides a computer program product, including instructions. When the computer program product runs on a computer, the computer performs the critical BSS parameter management method applicable to multiple links according to the first aspect or the second aspect.

According to an eighteenth aspect, this application provides a computer program product, including instructions. When the computer program product runs on a computer, the computer performs the method for updating a critical BSS parameter according to the fifth aspect or the sixth aspect.

Implementation of embodiments of this application may help some APs or all APs in some AP MLDs to notify STAs managed by the APs whether critical BSS parameters of the APs (managed BSSs) are updated, to assist the STAs in receiving latest critical BSS parameters. Therefore, after the critical BSS parameters of the APs are updated, the STA can also communicate with the AP.

BRIEF DESCRIPTION OF DRAWINGS

To describe the technical solutions in embodiments of this application more clearly, the following briefly describes the accompanying drawings used for describing embodiments.

FIG. 11*a* is a schematic diagram of a frame structure of an inclusion of a channel switch announcement element according to an embodiment of this application;

FIG. 11*b* is a schematic diagram of a frame structure of an inclusion of an extended channel switch announcement element according to an embodiment of this application;

FIG. 11*c* is a schematic diagram of a frame structure of an inclusion of a wide bandwidth channel switch element according to an embodiment of this application;

FIG. 11*d* is a schematic diagram of a frame structure of a quiet element (Quiet element) according to an embodiment of this application;

FIG. 12 is a schematic diagram of a frame structure of a non-inherited element according to an embodiment of this application;

FIG. 13 is a schematic diagram of a structure of a communication apparatus 1 according to an embodiment of this application;

FIG. 14 is a schematic diagram of a structure of a communication apparatus 2 according to an embodiment of this application;

DESCRIPTION OF EMBODIMENTS

Figures 1, 2:
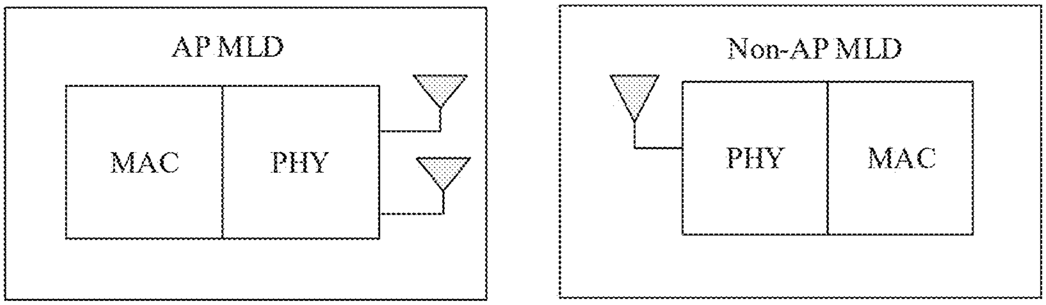
FIG. 1 is a schematic diagram of a structure of an AP MLD and a structure of a non-AP MLD according to an embodiment of this application.
FIG. 2 is a schematic diagram of a frame format of a multiple BSSID element according to an embodiment of this application.

The following clearly describes the technical solutions in embodiments of this application with reference to the accompanying drawings in embodiments of this application.

To better understand a critical BSS parameter management method applicable to multiple links and a related apparatus that are disclosed in embodiments of this application, related concepts in embodiments of this application are first described.

1. Multi-Link Device

A wireless communication system applicable to the embodiments of this application may be a wireless local area network (wireless local area network, WLAN) or a cellular network. A unicast service indication method may be implemented by a communication device in the wireless communication system or a chip or a processor in the communication device. The communication device may be a wireless communication device that supports concurrent transmission performed on multiple links. For example, the communication device is referred to as a multi-link device (Multi-link device) or a multi-band device (multi-band device). Compared with a device that supports only single-link transmission, the multi-link device has higher transmission efficiency and a higher throughput.

The multi-link device includes one or more affiliated stations (affiliated STA). The affiliated stations are a logical station and may work on one link. The affiliated station may be an access point (access point, AP) or a non-access point station (non-access point station, non-AP STA). For ease of description, in this application, a multi-link device whose affiliated station is an AP may be referred to as a multi-link AP, a multi-link AP device, or an AP multi-link device (AP multi-link device, AP MLD), and a multi-link device whose affiliated station is a non-AP STA may be referred to as a multi-link non-AP, a multi-link non-AP device, or a non-AP multi-link device (Non-AP multi-link device, non-AP MLD). For ease of description, "the multi-link device includes an affiliated station" is also briefly described as "the multi-link device includes a station" in the embodiments of this application.

The multi-link device includes one or more affiliated stations (affiliated STA). In other words, one multi-link device may include a plurality of logical stations. Each logical station works on one link, but a plurality of logical stations can work on a same link.

The multi-link device may implement wireless communication according to 802.11 family of standards. For example, a station complying with an extremely high throughput (extremely high throughput, EHT), or a station complying with 802.11be or compatible with a station supporting 802.11be implements communication with another device. Certainly, the another device may be a multi-link device, or may not be a multi-link device.

For example, the multi-link device in embodiments of this application may be a single-antenna device, or may be a multi-antenna device. For example, the multi-link device may be a device with more than two antennas. A quantity of antennas included in the multi-link device is not limited in this embodiment of this application. In embodiments of this application, the multi-link device may allow services of a same access type to be transmitted on different links, or even allow same data packets to be transmitted on different links. Alternatively, the multi-link device may not allow services of a same access type to be transmitted on different links, but may allow services of different access types to be transmitted on different links.

For example, the multi-link device is an apparatus having a wireless communication function. The apparatus may be a device of an entire system, or may be a chip, a processing system, or the like installed in the device of the entire system. The device on which the chip or the processing system is installed may be controlled by the chip or the processing system, to implement the method and functions in embodiments of this application. For example, the non-AP MLD in embodiments of this application has a wireless transceiver function, may support the 802.11 series protocols, and may communicate with an AP MLD, another non-AP MLD, or a single-link device. For example, the non-AP MLD is any user communication device that allows a user to communicate with an AP and further communicate with a WLAN. For example, the non-AP MLD may be user equipment that can be connected to a network, such as a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), or a mobile phone, may be an Internet of Things node in an Internet of Things, or may be a vehicle-mounted communication apparatus in an Internet of Vehicles. The non-AP MLD may alternatively be a chip and a processing system in the foregoing terminals.

The AP MLD in the embodiments of this application is an apparatus that serves the non-AP MLD, and may support the 802.11 series protocols. For example, the AP MLD may be a communication entity such as a communication server, a router, a switch, or a bridge, or the AP MLD may include various forms of macro base stations, micro base stations, and relay stations. Certainly, the AP MLD may alternatively be a chip and a processing system in the various forms of devices, to implement the method and the function in the embodiments of this application. In addition, the multi-link device may support high-rate and low-latency transmission. With continuous evolution of wireless local area network application scenarios, the multi-link device may be further used in more scenarios. For example, the multi-link device serves as a sensor node (for example, a smart water meter, a smart electricity meter, or a smart air detection node) in a smart city, a smart device (for example, a smart camera, a projector, a display screen, a television, a stereo, a refrigerator, or a washing machine) in smart home, a node in the Internet of things, an entertainment terminal (for example, AR, VR, or another wearable device), a smart device (for example, a printer, or a projector) in a smart office, an Internet of vehicles device in the Internet of vehicles, or an infrastructure (for example, a vending machine, a self-service navigation console, a self-checkout device, or a self-service food machine) in daily life scenarios. Specific forms of the non-AP MLD and the AP MLD are not specifically limited in the embodiments of this application, and are merely examples for description herein. The 802.11 protocol may be a protocol that supports 802.11be or is compatible with 802.11be.

Frequency bands on which the multi-link device works may include but are not limited to sub 1 GHz, 2.4 GHz, 5 GHZ, 6 GHZ, and a high frequency 60 GHz.

For example, the multi-link device in embodiments of this application may be a single-antenna device, or may be a multi-antenna device. For example, the multi-link device in this embodiment of this application may be a device with at least two antennas. A quantity of antennas included in the multi-link device is not limited in this embodiment of this application. FIG. 1 is a schematic diagram of a structure of an AP MLD and a structure of a non-AP MLD according to an embodiment of this application. FIG. 1 is a schematic diagram of a structure on which the AP MLD has a plurality of antennas and a structure on which the non-AP MLD has a single antenna. The 802.11 standard focuses on physical layer (Physical layer, PHY) and medium access control (Medium Access Control, MAC) layer parts in the AP MLD and the non-AP MLD.

2. Link Identifier

A link identifier represents one station working on one link. In other words, if there is more than one station on one link, more than one link identifiers represent the more than one station. A link mentioned below sometimes also represents a station working on the link.

During data transmission, an AP MLD and a non-AP MLD may use a link identifier to identify a link or a station on a link. Before communication, the AP MLD and the non-AP MLD may first negotiate or communicate with each other on a correspondence between a link identifier and a link or a station on a link. Therefore, during data transmission, a link identifier is carried to indicate a link or a station on a link, so that transmission of a large amount of signaling information is not needed to indicate the link or the station on the link. This reduces signaling overheads and improves transmission efficiency.

In an example, a management frame sent by the AP MLD when establishing a basic service set (basic service set, BSS), for example, a beacon (beacon) frame, carries one element, and the element includes multiple link identification information fields. The link identifier information field may indicate a correspondence between a link identifier and a station that works on a link corresponding to the link identifier. The link identification information field not only includes the link identification, but also includes one or more pieces of the following information: a medium access control (Medium Access Control, MAC) address, an operating class, and a channel number. One or more of the MAC address, the operating class, and the channel number may indicate one link. For the AP, the MAC address of the AP is also a BSSID (basic service set identifier, basic service set identifier) of the AP. In another example, in a process of multi-link device association, an AP MLD and a non-AP MLD negotiate multiple link identification information fields. The multi-link device association refers to that one AP in the AP MLD is associated with one STA in the non-AP MLD once. The association may help a plurality of STAs in the non-AP MLD separately associate with a plurality of APs in the AP MLD, where one STA is associated with one AP.

In subsequent communication, the AP MLD or the non-AP MLD represents a station in the non-AP MLD by using a link identifier, and the link identifier may further represent one or more attributes of the MAC address, the operating class, or the channel number of the station. The MAC address may be replaced with an association identifier of the AP MLD after association. Optionally, if a plurality of stations work on one link, meanings identified by a link identifier (which is a numeric ID) include not only an operating class including the link and a channel number, but also an identifier of a station working on the link, for example, a MAC address or an association identifier (association identifier, AID) of a station.

3. Multiple Basic Service Set Identifier (Multiple BSSID Set)

A multiple basic service set identifier set (Multiple BSSID set, which may be referred to as a multiple BSSID set) may be understood as a set of some cooperative APs. All cooperative APs use a same operating class a channel number, and an antenna interface. In the multiple BSSID set, there is only one AP that transmits (Transmitted) a BSSID, and all other APs are nontransmitted (nontransmitted) BSSID APs. Information about a multiple BSSID set (that is, a multiple BSSID element) is carried in a beacon frame, a probe response frame, or a neighbor report sent by an AP with a transmitted BSSID. Information about the BSSID of the AP with the nontransmitted BSSID is derived by the station by using the beacon frame, the probe response frame, the multiple BSSID element in a neighbor report, or the like. The BSSID of the AP with the nontransmitted BSSID is calculated based on a BSSID of the AP that transmits the BSSID and a BSSID index field in a multiple BSSID-index element in a nontransmitted BSSID profile, for details, refer to Draft 802.11REVmd_D3.0.

The multiple BSSID set may also be understood as including a plurality of APs. Each AP manages one BSS, and different APs may have different SSIDs and permissions, for example, a security mechanism or a transmission opportunity.

In the multiple BSSID set, only an AP whose BSSID is a transmitted BSSID can send a beacon frame (beacon) and a probe response frame (Probe Response), and an AP whose BSSID is a nontransmitted BSSID does not send a beacon frame. Therefore, if a probe request frame (Probe Request) sent by a STA is sent to the AP whose BSSID is the nontransmitted BSSID in the multiple BSSID set, in this case, the AP whose BSSID is the transmitted BSSID in the multiple BSSID set helps respond to send a probe response frame.

In a plurality of APs in the multiple BSSID set, a BSSID of one AP is configured as a transmitted (Transmitted) BSSID, an AP with a transmitted BSSID may be referred to as a transmitted (transmitted) AP, BSSIDs of other APs are configured as nontransmitted (nontransmitted) BSSIDs, and an AP with a nontransmitted BSSID may be referred to as a nontransmitted (nontransmitted) AP.

The beacon frame sent by the transmitted AP may include a multiple BSSID element. A frame format of the multiple BSSID element is shown in FIG. 2. FIG. 2 is a schematic diagram of a frame format of the multiple BSSID element according to an embodiment of this application. The multiple BSSID element includes an element ID field, a length field, a maximum BSSID indication field, and an optional subelement field. The maximum BSSID indication field indicates a maximum quantity N of BSSIDs included in the multiple BSSID set, and an optional subelement field includes information about a BSSID of an AP with a nontransmitted BSSID.

A maximum quantity of APs allowed in the multiple BSSID set is 2n, n is a value indicated by a MaxBSSID Indicator field in the multiple BSSID element shown in FIGS. 2, and N=2n. Therefore, bits 1 to 2n−1 of a service indication virtual bitmap field may be respectively allocated to APs in nontransmitted BSSIDs in the multiple BSSID set, to respectively indicate whether APs in the nontransmitted BSSIDs whose NonTxBSS IDs (identifiers) are 1 to 2n−1 have a multicast service. A value of the NonTxBSS ID is equal to a value of a BSSID Index field in a Multiple BSSID-Index element in a nontransmitted BSSID profile in the multiple BSSID element. The nontransmitted BSSID profile is in an optional subelement field.

4. Critical BSS Parameter

For example, a critical BSS parameter may include one or more of the following: an inclusion of a channel switch announcement element (Inclusion of a Channel Switch Announcement element), an inclusion of an extended channel switch announcement element (Inclusion of an Extended Channel Switch Announcement element), a modification of the EDCA (enhanced distributed channel access, EDCA) parameters element (Modification of the EDCA parameters element), an inclusion of a quiet element (Inclusion of a Quiet element), a modification of the DSSS parameter set (Modification of the DSSS Parameter Set), a modification of the CF parameter set element (Modification of the CF Parameter Set element), a modification of the HT operation element (Modification of the HT Operation element), an inclusion of a wide bandwidth channel switch element (Inclusion of a Wide Bandwidth Channel Switch element), an inclusion of a channel switch wrapper element (Inclusion of a Channel Switch Wrapper element), an inclusion of an operating mode notification element (Inclusion of an Operating Mode Notification element), an inclusion of a quiet channel element (Inclusion of a Quiet Channel element), a modification of the VHT (very high throughput) operation element (Modification of the VHT Operation element), a modification of the HE (high efficient) operation element (Modification of the HE Operation element), an insertion of a broadcast TWT element (Insertion of a Broadcast TWT element), an inclusion of the BSS color change announcement element (Inclusion of the BSS Color Change Announcement element), a modification of the MU EDCA parameter set element (Modification of the MU EDCA Parameter Set element), and a modification of the spatial reuse parameter set element (Modification of the Spatial Reuse Parameter Set element). One or more of the foregoing critical BSS parameters may also be listed as the critical parameter of the link.

5. Specific Critical BSS Parameter

A specific critical BSS parameter may refer to a parameter related to a channel change in critical BSS parameters. Specifically, the specific critical BSS parameter includes one or more of the following: an inclusion of a channel switch announcement element (Inclusion of a Channel Switch Announcement element), an inclusion of an extended channel switch announcement element (Inclusion of an Extended Channel Switch Announcement element), an inclusion of a wide bandwidth channel switch element (Inclusion of a Wide Bandwidth Channel Switch element), and an inclusion of a channel switch wrapper element (Inclusion of a Channel Switch Wrapper element).

Although the embodiments of this application are mainly described by using a network on which IEEE 802.11 is deployed as an example, a person skilled in the art easily understands that various aspects of this application can be extended to other networks that use various standards or protocols, for example, BLUETOOTH (Bluetooth), a high performance radio LAN (high performance radio LAN, HIPERLAN) (a wireless standard that is similar to the IEEE 802.11 standard, and is mainly used in Europe), a wide area network (WAN), a wireless local area network (wireless local area network, WLAN), a personal area network (personal area network, PAN), or another known or later developed network. Therefore, the various aspects provided in this application are applicable to any suitable wireless network regardless of coverage and a wireless access protocol.

Figure 3A:
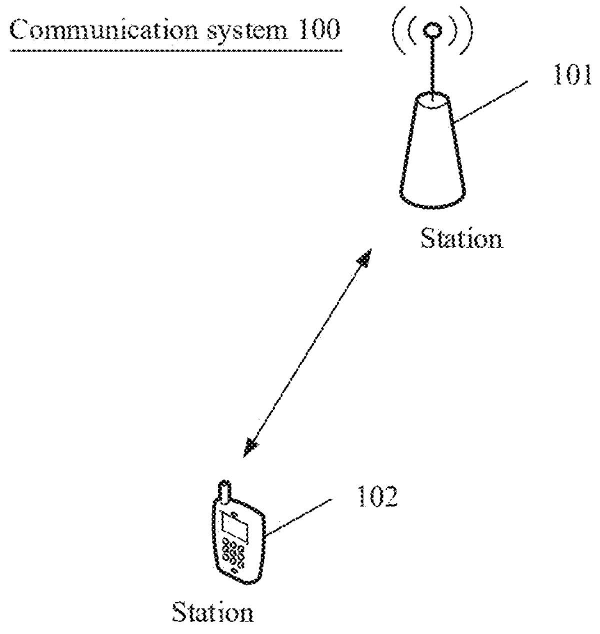
FIG. 3*a* is a schematic diagram of a structure of a communication system 100 according to an embodiment of this application.

FIG. 3*a* is a schematic diagram of a structure of a communication system 100 according to an embodiment of this application. In FIG. 3*a*, a wireless local area network is used as an example to describe the communication system 100 to which an embodiment of this application is applied. The communication system 100 includes a station 101 and a station 102. The station 101 may communicate with the station 102 through multiple links, to improve a throughput. The station 101 may be a multi-link device, and the station 102 may be a single-link device, a multi-link device, or the like. In a scenario, the station 101 is an AP MLD, and the station 102 is a non-AP MLD or a station (for example, a single-link station). In another scenario, the station 101 is a non-AP MLD, and the station 102 is an AP (for example, a single-link AP) or an AP MLD. In still another scenario, the station 101 is an AP MLD, and the station 102 is an AP MLD or an AP. In yet another scenario, the station 101 is a non-AP MLD, and the station 102 is a non-AP MLD or a STA (for example, a single-link station). Certainly, the wireless local area network may further include another device. A quantity and a type of devices shown in FIG. 3*a* are merely examples.

Figure 3B:
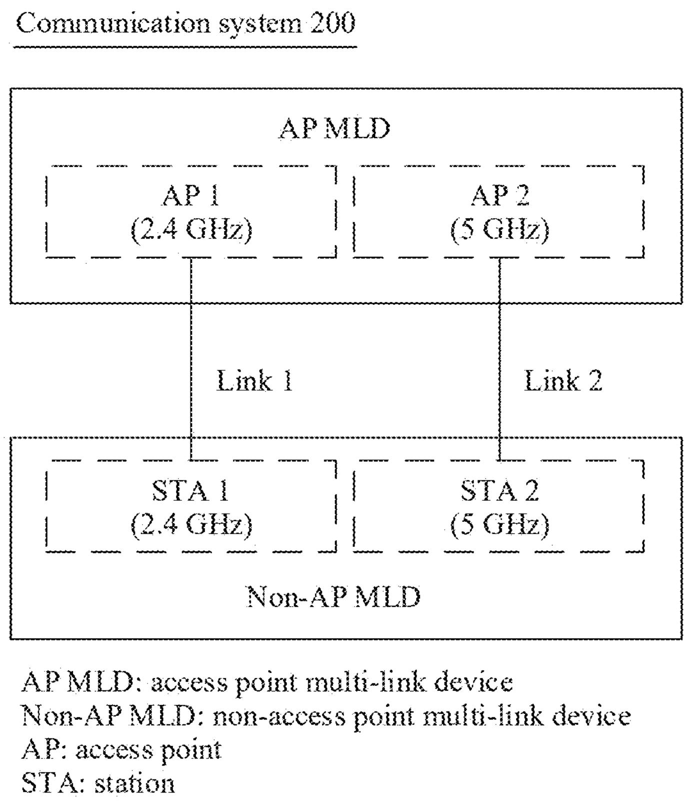
FIG. 3*b* is a schematic diagram of a structure of a communication system 200 according to an embodiment of this application.
Figure 3C:
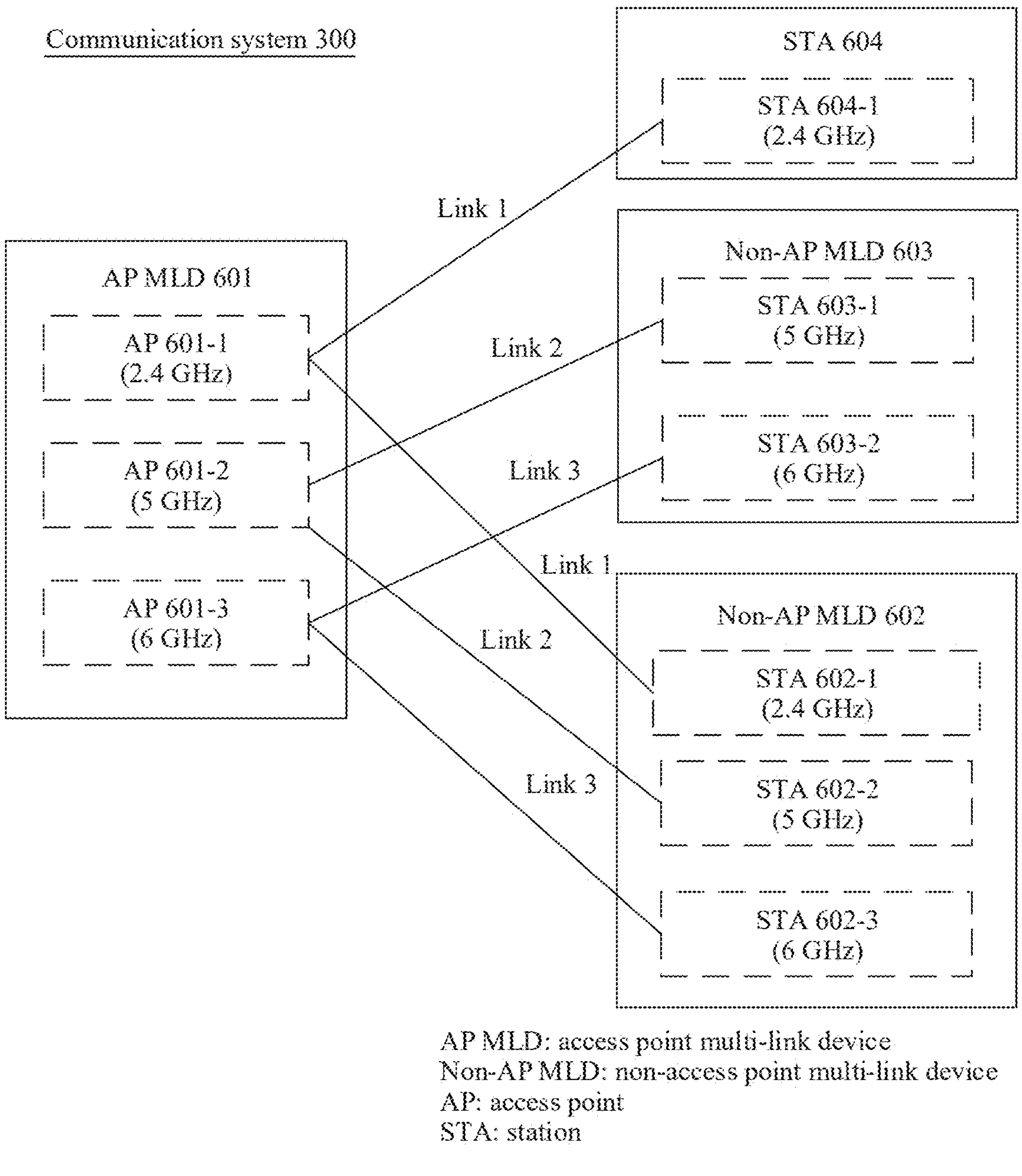
FIG. 3*c* is a schematic diagram of a structure of a communication system 300 according to an embodiment of this application.

FIG. 3*b* is a schematic diagram of a structure of a communication system 200 according to an embodiment of this application. FIG. 3*c* is a schematic diagram of a structure of a communication system 300 according to an embodiment of this application. FIG. 3*b* and FIG. 3*c* respectively show schematic diagrams of structures of the communication system 200 and the communication system 300. In the communication system 200 and the communication system 300, for example, a multi-link device in a wireless local area network communicates with another device through multiple links.

Specifically, FIG. 3*b* shows a scenario on which an AP MLD and a non-AP MLD communicate with each other. The AP MLD includes an affiliated AP 1 and an affiliated AP 2, and the non-AP MLD includes a STA 1 and a STA 2 to which the non-AP MLD belongs. In addition, the AP MLD and the non-AP MLD communicate in parallel through a link 1 and a link 2.

FIG. 3*c* shows a scenario on which an AP MLD 601 communicates with a non-AP MLD 602, a non-AP MLD 603, and a STA 604. The AP MLD 601 includes an affiliated AP 601-1 to an affiliated AP 601-3. The non-AP MLD 602 includes three affiliated STAs: a STA 602-1, a STA 602-2, and a STA 602-3. The non-AP MLD 603 includes two affiliated STAs: a STA 603-1 and a STA 603-2. The STA 604-1 and the STA 604 are single-link devices. The AP MLD 601 may separately communicate with the non-AP MLD 602 through the link 1, the link 2, and a link 3, communicate with the non-AP MLD 603 through the link 2 and the link 3, and communicate with the STA 604 through the link 1. In an example, the STA 604 works in a 2.4 GHz frequency band. In the non-AP MLD 603, the STA 603-1 works in a 5 GHz frequency band, and the STA 603-2 works in a 6 GHz frequency band. In the non-AP MLD 602, the STA 602-1 works in a 2.4 GHz frequency band, the STA 602-2 works in a 5 GHz frequency band, and the STA 602-3 works in a 6 GHz frequency band. The AP 601-1 that is in the AP MLD 601 and that works in the 2.4 GHz frequency band may transmit uplink or downlink data to the STA 604 and the STA 602-1 in the non-AP MLD 602 through the link 1. The AP 601-2 that is in the AP MLD 601 and that works in the 5 GHz frequency band may transmit uplink or downlink data to the STA 603-1 that is in the non-AP MLD 603 and that works in the 5 GHz frequency band through the link 2, and may further transmit uplink or downlink data to the STA 602-2 that is in the non-AP MLD 602 and that works in the 5 GHz frequency band through the link 2. The AP 601-3 that is in the AP MLD 601 and that works in the 6 GHz frequency band may transmit uplink or downlink data to the STA 602-3 that is in the non-AP MLD 602 and that works in the 6 GHz frequency band through the link 3, and may further transmit uplink or downlink data with the STA 603-2 in the non-AP MLD through the link 3.

It may be understood that FIG. 3*b* shows only that the AP MLD supports two frequency bands, and FIG. 3*c* shows only that the AP MLD 601 supports three frequency bands (2.4 GHz, 5 GHz, and 6 GHz). Each frequency band corresponds to one link. For example, the AP MLD 601 may work on one or more links of the link 1, the link 2, or the link 3. On an AP side or a STA side, the link herein may also be understood as a station working on the link. In actual application, the AP MLD and the non-AP MLD may further support more or fewer frequency bands. In other words, the AP MLD and the non-AP MLD may work on more links or fewer links. This is not limited in this embodiment of this application.

Figure 4:
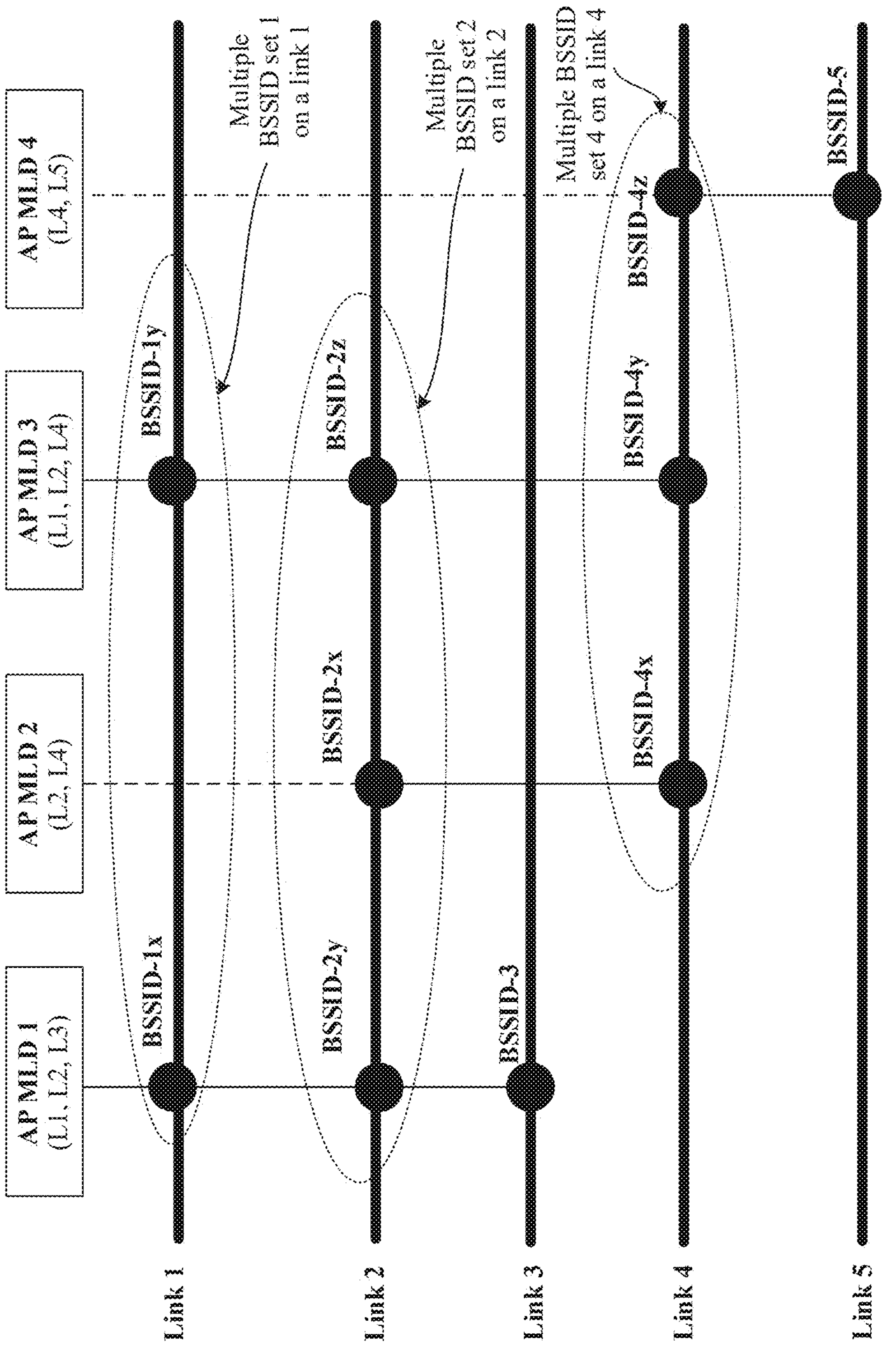
FIG. 4 is a schematic architectural diagram of a multiple BSSID set according to an embodiment of this application.

FIG. 4 is a schematic architectural diagram of a multiple BSSID set according to an embodiment of this application. To be specific, an MLD of each AP shown in FIG. 4 is a collocated AP MLD set (collocated AP MLD set).

A BSSID-1x, a BSSID-1y, a BSSID-2x, a BSSID-2y, a BSSID-2z, a BSSID-4x, a BSSID-4y, a BSSID-4z, a BSSID-3, and a BSSID-5 are MAC address identifiers respectively, and are used to identify corresponding APs. It is assumed that an AP whose MAC address identifier ends with x is a transmitted BSSID AP, an AP whose MAC address identifier ends with y or z is a nontransmitted BSSID AP, an AP whose MAC address identifier ends only with a digit is a common AP, and the common AP refers to an AP that does not belong to the multiple BSSID set. For example, a transmitted BSSID AP in a multiple BSSID set 1 is an AP 1x whose MAC address identifier is BSSID 1x. A nontransmitted BSSID AP in the multiple BSSID set 1 is an AP 1y whose MAC address identifier is BSSID 1y. A transmitted BSSID AP in a multiple BSSID set 2 is an AP 2x whose MAC address identifier is BSSID 2x. A nontransmitted BSSID AP in the multiple BSSID set 2 includes an AP 2y whose address identifier is BSSID_2y and an AP 2z whose MAC address identifier is BSSID 2z.

An AP MLD set sharing a location with a reporting AP includes the following APs, where the reporting AP refers to an AP that sends a management frame. The management frame carries information about the following plurality of APs, and the management frame is a beacon frame, a probe response frame, or the like. The reporting AP includes a transmitted AP and a common AP in the multiple BSSID set. The MLD set of APs that share the same location with the reporting AP includes the following APs:

(1) All APs that belong to a same AP MLD as the reporting AP, or all APs in an AP MLD including the reporting AP.

(2) All APs in an AP MLD to which a nontransmitted AP in a same multiple BSSID set as the reporting AP (or a transmitted AP) is affiliated; or all APs in an AP MLD to which a nontransmitted AP in the multiple BSSID set to which the reporting AP (or a transmitted AP) belongs.

(3) All APs in an AP MLD that satisfies the following two conditions: (1) At least one AP in the AP MLD is in a same multiple BSSID set as one AP in the AP MLD to which the reporting AP is affiliated; and (2) no AP in the AP MLD works on a same link as the reporting AP.

Optionally, in an implementation, one AP MLD includes only one AP.

Optionally, the reporting AP may be a common AP (for example, in FIG. 4, an AP 3 whose MAC address identifier is BSSID_3 and an AP 5 whose MAC address identifier is BSSID_5) in the AP MLD or the transmitted AP in the multiple BSSID set, and can send unicast service indication information described in this application.

For example, an AP 1x in FIG. 4 is used as a reporting AP, an AP MLD set sharing a location with the AP 1x includes the following APs.

(1) All APs in a same AP MLD 1 as the AP 1x, that is, the AP 1x, the AP 2y, and the AP 3.

(2) All APs in an AP MLD 3 including a nontransmitted AP (that is, the AP 1y) in the same multiple BSSID set 1 as the AP 1x are respectively the AP 1y, the AP 2z, and an AP 4y.

(3) In FIG. 4, an AP MLD that meets the foregoing conditions (1) and (2) is an AP MLD 2, that is, includes an AP 2x and an AP 4x, the AP 2x in the AP MLD 2 and the AP 2y in the AP MLD 1 are in the same multiple BSSID set 2, and no AP in the AP MLD 2 is on a same link with the AP 1x.

In the 802.11 protocol, a STA generally has two working modes: a non-power-saving mode and a power-saving mode. When the STA works in the non-power-saving mode, the STA is in an active state (active state, which may also be referred to as an awake state) regardless of whether there is to-be-transmitted data on the STA. When the STA works in the power-saving mode, the STA may be in an active state (active state) when transmitting data with an AP. When there is no data transmission between the STA and the AP, the STA may be in a doze state (doze state) to reduce power consumption. The STA may send a frame to the AP to notify whether the STA is in the power-saving mode. If a power-saving bit in a frame control field (frame control field) in a MAC header of the frame is set to 1, the AP is notified that the STA is in the power-saving mode. If the power-saving bit in the frame control field (frame control field) in the MAC header of the frame is set to 0, the AP is notified that the STA is in the non-power-saving mode.

It may be understood that "data transmission" and "transmission data" mentioned in this application generally refer to communication. "Data" generally refers to communication information, is not limited to data information, and may also be signaling information or the like.

In an energy saving mechanism based on wireless network management (wireless network management, WNM) or an energy saving mechanism based on a target wake time (target wake up time, TWT), a STA may communicate with an AP about a wake period. The AP sends a broadcast traffic indication map (traffic indication map, TIM) frame to a plurality of corresponding STAs at a beginning of each wake period. The TIM frame is far shorter than a beacon (Beacon) frame. A TIM element included in the TIM frame is used to notify the plurality of STAs whether there are corresponding downlink service indications. Because the TIM frame is much shorter than the beacon frame, the STA may obtain a power saving effect. In a WNM energy saving mechanism, a TIM broadcast interval (TIM broadcast interval) field in a TIM request frame sent by the STA or a TIM response returned by the AP indicates the wakeup period. Alternatively, in a TWT energy saving mechanism, the wakeup period corresponds to a TWT wakeup interval in the TWT energy saving mechanism, where the TWT wakeup interval is calculated based on a TWT wakeup duration decimal field and a TWT wakeup interval exponent field in a TWT element. Specifically, TWT wakeup interval=TWT wakeup duration decimal*2 (TWT wake interval exponent).

Figure 5:
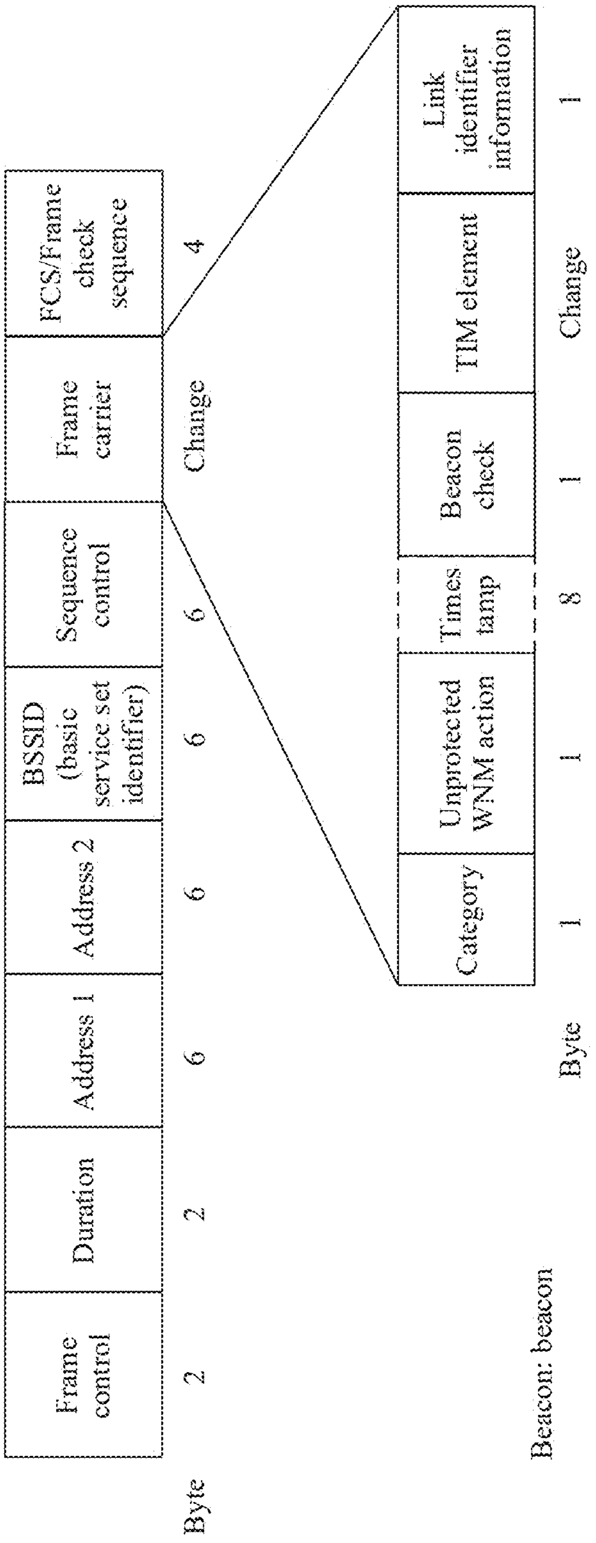
FIG. 5 is a schematic diagram of a frame structure of a TIM frame according to an embodiment of this application.

FIG. 5 is a schematic diagram of a frame structure of a TIM frame according to an embodiment of this application. As shown in FIG. 5, a frame carrier in the TIM frame may include at least one of the following: a type (category) field, an unprotected WNM behavior field, a timestamp field, a beacon frame (Beacon) check field, a TIM element field, and a link identification information field. The unprotected WNM action field indicates different action values. The timestamp field indicates clock information. The TIM element field indicates whether a STA or a non-AP MLD identified by an AID has a downlink service. The link identification information field indicates a specific link. The beacon frame (Beacon) check field indicates a BSS on which a link indicated by the link identification information field is located or used to indicate whether a critical BSS parameter of an AP indicated by the link identification information field is updated. Alternatively, the beacon frame (Beacon) check field indicates whether a critical parameter of a link indicated by the link identification information field is updated.

For example, if a critical BSS parameter of a BSS on which the link indicated by the link identification information field is located is updated, or a critical parameter of the link indicated by the link identification information field is updated, a value of the beacon check field is increased by 1. The BSS parameter may also be understood as a link parameter. Correspondingly, the critical BSS parameter may be understood as a critical link parameter.

For example, each time a non-AP MLD memorizes a value of a beacon check field that corresponds to each link and that is received last time. If a recently received beacon check field corresponding to a link is different from a value of a beacon check field corresponding to a link that is received last time, the non-AP MLD receives, on the link, a beacon frame sent by an AP MLD. Alternatively, the non-AP MLD may send the probe request frame on any link, where the probe request frame is used to request a latest critical BSS parameter of one or more APs. The probe request frame includes a link identifier corresponding to the one or more APs. Optionally the probe request frame further includes an MLD identifier of an MLD including the AP, for example, an MLD MAC address or an MLD sequence number of the AP MLD. After receiving the probe request frame, the AP MLD returns an acknowledgment frame, and then sends a probe response frame to the non-AP MLD. The probe response frame includes a latest critical BSS parameter of the one or more APs requested by the non-AP MLD. After receiving the frame, the non-AP MLD replies with the acknowledgment frame. In the probe response frame, a value of the beacon check field corresponding to the one or more APs changes. It may be understood that the beacon frame carries the latest critical BSS parameter of the link.

It may be understood that, because the TIM frame includes the link identification information field, when the TIM frame is used, in one BSS, even if the non-AP MLD includes a plurality of STAs, only one AID is required. In combination with identification information of the link and the AID, a station that works on the link indicated by the link identification information field and that has a downlink service may be determined.

Figure 6:
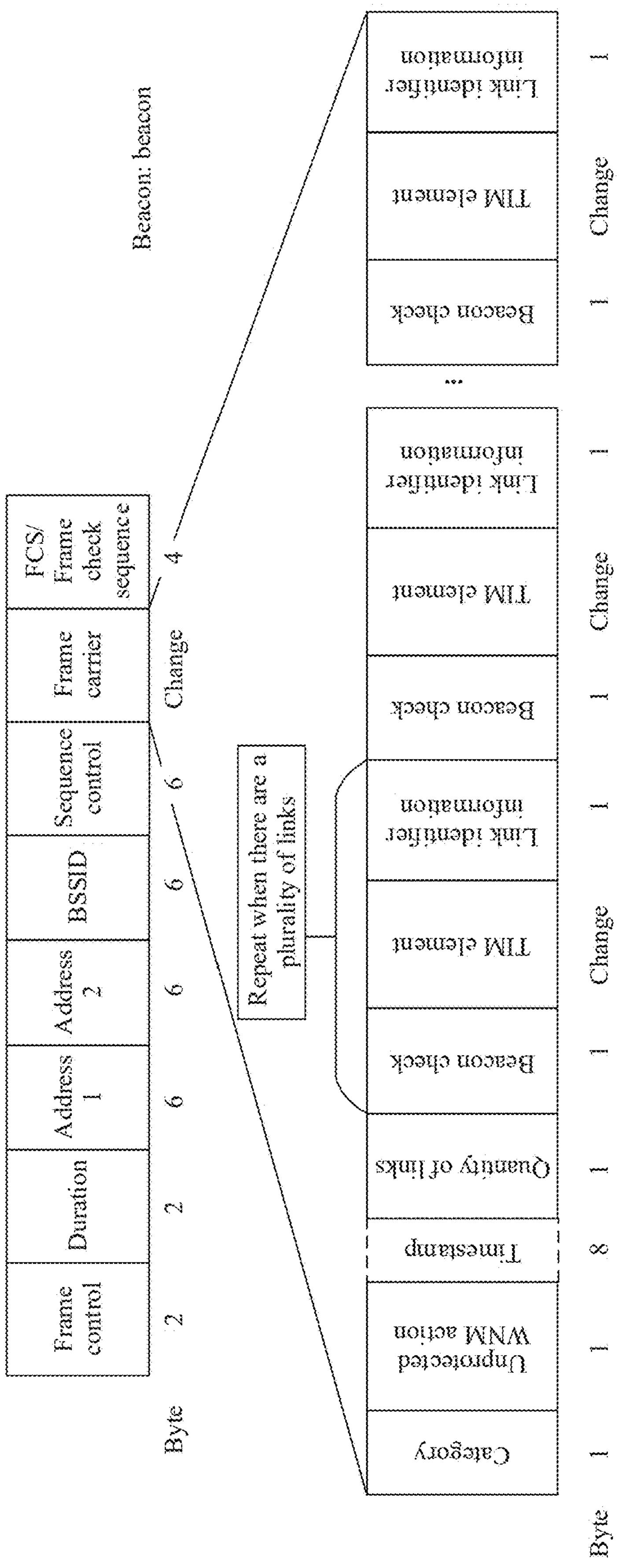
FIG. 6 is a schematic diagram of a frame structure of a management frame according to an embodiment of this application.

It may be further understood that the beacon check field and the link identifier information field that are included in the TIM frame may be alternatively placed in another management frame. The plurality of fields (refer to the beacon check field and the link identifier information field herein) may be separately used to notify whether a critical BSS parameter in a BSS on which the link indicated by the link identification information field is located is changed/updated. The foregoing method may also be used for determining whether a critical BSS parameter in a plurality of BSSs on which multiple links are located is changed/updated. For example, the management frame includes a quantity of links, n beacon check fields, and n link identification information fields, where n is indicated by a link quantity field. For another example, the management frame includes a link identifier bitmap and n beacon check fields, and optionally includes a length field of the link identifier bitmap, where n is a quantity of first values (for example, 1) of the link identifier bitmap. Values of one or more beacon check fields are initialized to 0. In an implementation, FIG. 6 is a schematic diagram of a frame structure of a management frame according to an embodiment of this application. As shown in FIG. 6, a frame carrier of the management frame includes a type field, an unprotected WNM behavior field, a link quantity field, a beacon check field, a TIM element field, and a link identification information field. When multiple links are indicated by the link quantity field, for each link, there is one beacon check field, one TIM element field, and one link identification information field. Optionally, the frame carrier of the management frame may further include one or more timestamp fields. The management frame shown in FIG. 6 may indicate whether a plurality of stations that work on a link indicated by each link identification information field have a downlink service.

In conclusion, as shown in FIG. 4, some APs (for example, nontransmitted APs in a same multiple BSSID set) cannot send a management frame. Therefore, these APs cannot notify, by sending the management frame such as a beacon frame or a probe response frame, an associated STA/non-AP MLD that whether critical BSS parameters of BSSs managed by these APs are updated. Therefore, the STA/non-AP MLD associated with these APs and listening on working links of these APs does not know that the critical BSS parameters of these APs are updated. As a result, after the critical BSS parameters are updated by these APs update, the STA/non-AP MLD associated with these APs cannot work normally or cannot communicate with these APs.

Therefore, this embodiment of this application provides a critical BSS parameter management method applicable to multiple links. An AP MLD may help another AP MLD notify the another AP MLD of whether critical BSS parameters of a plurality of APs in the another AP MLD are updated, to resolve a problem that some APs cannot notify that the critical BSS parameters are updated. A STA may be assisted in receiving a latest critical BSS parameter, so that after the plurality of APs in the another AP MLD update the critical BSS parameter, a non-AP MLD associated with the another AP MLD of can still work normally. The following describes in detail the technical solutions provided in this application with reference to more accompanying drawings.

Embodiment 1

Embodiment 1 of this application describes a critical BSS parameter management method applicable to multiple links, and specifically relates to an update indication of the critical BSS parameter applicable to multiple links. Not only critical BSS parameter update count values of a plurality of APs in a first AP MLD (this value is located in a reduced neighbor report (reduced neighbor report, RNR) element) may be indicated, but also critical BSS parameter update count values of a plurality of APs in a second AP MLD may be indicated. Therefore, a non-AP MLD associated with the second AP MLD may listen on a link on which a nontransmitted AP in the second AP MLD works, and can also work normally. In other words, for the non-AP MLD, there may be more listening channel options.

Each reporting AP in the first AP MLD needs to send, to a non-AP MLD associated with the first AP MLD or a surrounding station (the surrounding station includes a station managed by the reporting AP and a station that is not associated with the first AP MLD), the critical BSS parameter update count values corresponding to the plurality of APs in the first AP MLD, and send the critical BSS parameter update count values corresponding to the plurality of APs in the second AP MLD. For ease of description, in Embodiment 1 of this application, a reporting AP in the first AP MLD is used.

Figure 7:
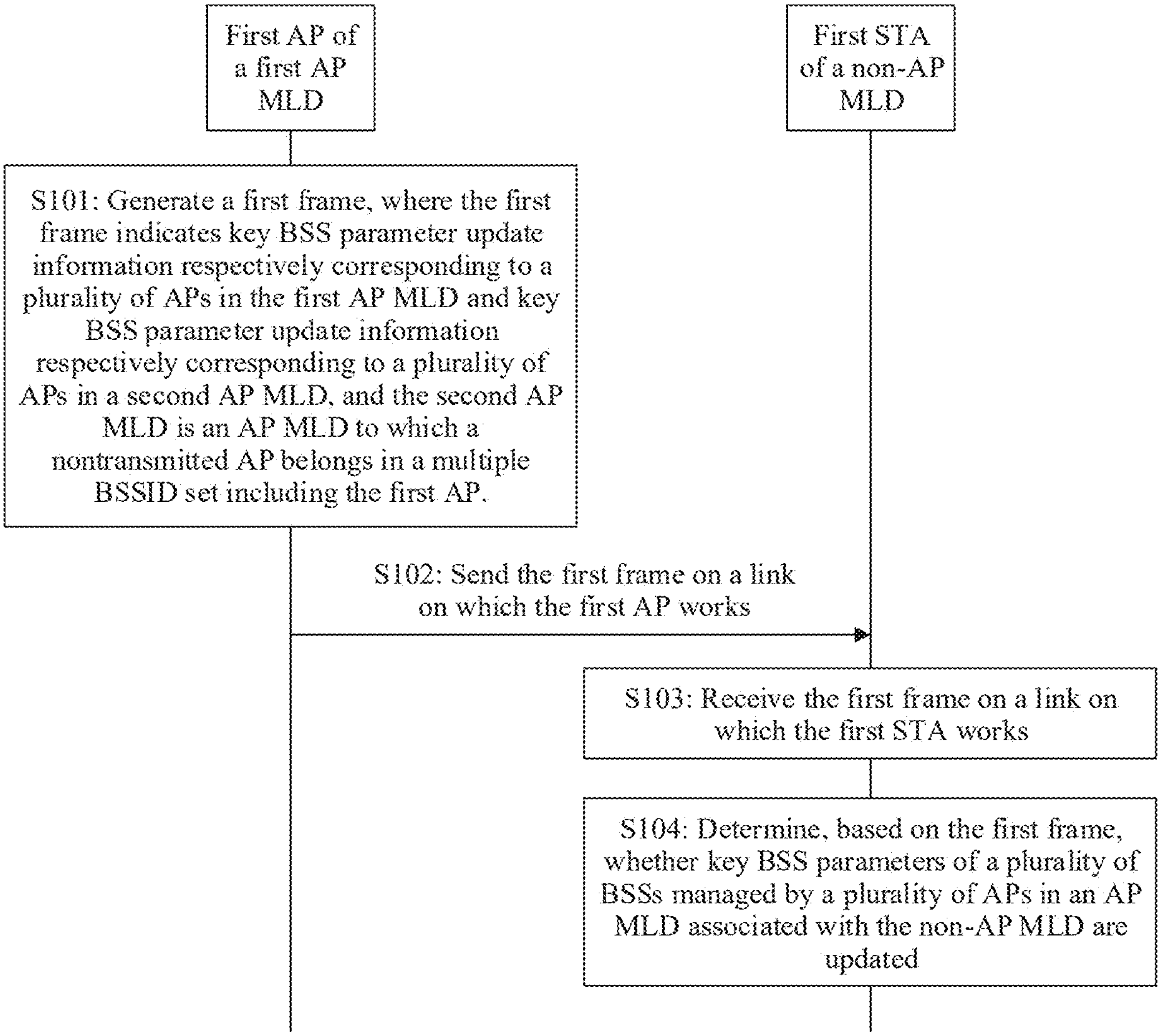
FIG. 7 is a schematic flowchart of a critical BSS parameter management method applicable to multiple links according to an embodiment of this application.

FIG. 7 is a schematic flowchart of a critical BSS parameter management method applicable to multiple links according to an embodiment of this application. An AP MLD includes one or more APs, and a first AP is any reporting AP in the AP MLD. Optionally, the reporting AP is not a nontransmitted AP in a multiple BSSID set. A first STA may be a single-link STA, or may be any STA in a non-AP MLD. For ease of description, the following uses the first STA in the non-AP MLD as an example. The first AP and the first STA work on a same link. As shown in FIG. 7, an association method applicable to a multi-link device includes but is not limited to the following steps.

S101: The first AP in the first AP MLD generates a first frame, where the first frame indicates critical BSS parameter update information respectively corresponding to a plurality of APs in the first AP MLD and critical BSS parameter update information respectively corresponding to a plurality of APs in a second AP MLD, and the second AP MLD is an AP MLD to which a nontransmitted AP belongs in a multiple BSSID set including the first AP. One piece of critical BSS parameter update information corresponding to one AP is used to determine whether a critical BSS parameter in a BSS managed by the AP is updated.

The first AP may be any reporting AP in the first AP MLD, and the reporting AP may be an AP that sends a management frame (for example, a beacon frame or a probe response frame). The critical BSS parameter update information includes a critical BSS parameter update count value.

The first frame may be the management frame, for example, the beacon frame, the probe response (probe response) frame, or another management frame. The first frame may indicate critical BSS parameter update count values respectively corresponding to the plurality of APs (the plurality of APs herein are all APs in the first AP MLD, or all APs or some APs in the first AP MLD except the first AP) in the first AP MLD and critical BSS parameter update count values respectively corresponding to the plurality of APs (the plurality of APs herein are all APs or some APs in the second AP MLD) in the second AP MLD. The second AP MLD is an AP MLD to which a nontransmitted AP in the multiple BSSID sets on which the first AP is located belongs. Optionally, the critical BSS parameter update count value is increased by 1 when one or more parameters of critical BSS parameters change/changes.

One critical BSS parameter update count value corresponding to one AP may be used to determine whether a critical BSS parameter in a BSS managed by the AP is updated. The critical BSS parameter update count value may be a natural number, and the critical BSS parameter update count value is initialized to 0. When a critical BSS parameter of a BSS managed by the AP changes, the critical BSS parameter update count value corresponding to the AP is increased by 1. Because there are critical BSS parameter update count values of a plurality of AP, each critical BSS parameter update count value is in a one-to-one correspondence with an identifier of an AP. The identifier of the AP may be a MAC address of the AP, a link identifier of the AP, or a combination of an operating class of the AP, a channel number, and a BSSID. The critical BSS parameter update count value may be carried in a reduced neighbor report element (reduced neighbor report element, RNR element) of the first frame. The following describes the reduced neighbor report element.

Optionally, in addition to a critical BSS parameter update count value field, the RNR element in this embodiment of this application may further include a link identifier field and an AP MLD identifier field (for example, an MLD ID field). The link identifier field indicates an AP or a station on which a specific link works. It may be understood that the link identifier field may be referred to as a link identifier information field or a link identifier bitmap field (used to indicate one bitmap in link identifiers corresponding to a plurality of APs). This is not limited in this embodiment of this application. The critical BSS parameter update count value field indicates the critical BSS parameter update count value. It may be understood that the critical BSS parameter update count value field may be referred to as a critical BSS parameter update field. This is not limited in this embodiment of this application. The AP MLD identifier field may be used to identify a specific AP MLD. It may be understood that the AP MLD identifier field may be an MLD ID field, an MLD index field, an MLD sequence number field, or the like, and a name of the identifier field is not limited.

Because the RNR element includes the link identifier field and the AP MLD identifier field (such as the MLD ID field), when the RNR element is used, even if each AP MLD includes a plurality of APs, each AP MLD has an identifier. In combination with identifier information of a link and identifier information of the AP MLD, an AP that works on a link indicated by the link identifier field and whose critical BSS parameter is updated may be determined.

It may be understood that, to associate with the AP, the station first needs to perform scanning to notify existence of the AP. There are two types of scanning: active scanning and passive scanning.

Passive scanning means that a station receives a management frame sent by an AP on a channel, such as a beacon frame, an association response frame, a reassociation response frame, an authentication frame, or a probe response frame. For example, the station transitions between different channels to search for the beacon frame sent by the AP. Once the station obtains admission control information of the AP by using the beacon frame, the station may further obtain other additional information from the AP by exchanging a probe request (Probe Request) frame and a probe response (Probe Response) frame.

Active scanning means that a station actively sends a broadcast probe request (Probe Request) frame when the station does not detect a beacon frame, where if a specific condition is satisfied, an AP receiving the probe request frame may initiate random channel access to reply with a probe response frame.

In the scanning process, to assist the station in fast scanning, the AP includes a reduced neighbor report element in a management frame, for example, a beacon (Beacon) frame or a probe response (Probe response) frame, to prevent the station from continuously performing channel scanning. This reduces scanning time of the station.

The AP carries the reduced neighbor report element in a management frame, for example, a beacon frame or a probe response frame. During scanning, a station receives a management frame sent by the AP, obtains information about surrounding APs based on the reduced neighbor report element in the management frame, and then chooses to be associated with an appropriate AP.

Figure 8A:
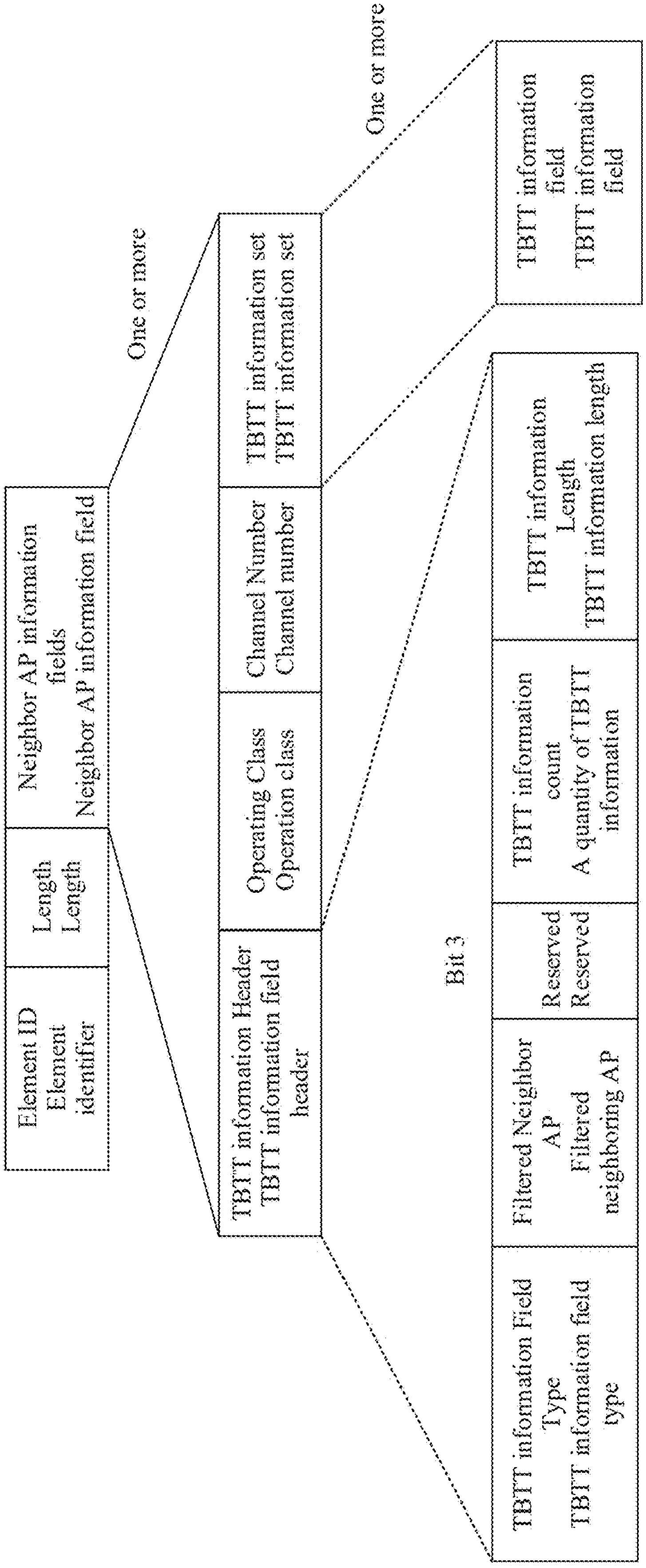
FIG. 8*a* is a schematic diagram of a frame structure of an RNR element according to an embodiment of this application.

Specifically, the reduced neighbor report element generally carries one or more neighbor AP information (Neighbor AP information) fields, which are used to describe one or more neighbor APs and information about BSSs to which the neighbor APs belong. FIG. 8*a* is a schematic diagram of a frame structure of an RNR element according to an embodiment of this application. As shown in FIG. 8*a*, the reduced neighbor report element may include some or all of the following fields: a target beacon transmission time (target beacon transmission time, TBTT) information header field (TBTT information Header field), an operating class (operating class) field, a channel number (channel number) field, and one or more TBTT information set (TBTT information set) fields. The TBTT information set field includes one or more TBTT information fields, and one TBTT information field corresponds to one neighbor AP.

The TBTT information header field carries at least one of the following information:

a TBTT information field type (TBTT information field type) field, indicating a type of TBTT information (TBTT information), where the field is used together with a TBTT information length (TBTT information length) field to indicate a format of the TBTT information field;

a filtered neighbor AP (filtered neighbor AP) field, indicating whether SSIDs of all BSSs carried in the neighbor AP information (neighbor AP information) field match an SSID in a probe request frame;

a 1-bit reserved (Reserved field);

a TBTT information count (TBTT information count) field, indicating a quantity of TBTT information fields included in a TBTT information set; and a TBTT information length (TBTT information length) field, indicating a length of each TBTT information field. The following Table 1 shows formats of carried specific information of different lengths.

TABLE 1

| TBTT information length (byte) | Content carried in a TBTT information field |
|---|---|
| 1 | TBTT offset field of a neighbor AP |
| 2 | TBTT offset field and BSS parameter field of a neighbor AP |
| 5 | TBTT offset field and short SSID field of a neighbor AP |
| 6 | TBTT offset field, short SSID field, and BSS parameter field of a neighbor AP |
| 7 | TBTT offset field and BSSID field of a neighbor AP |
| 8 | TBTT offset field, BSSID field, and BSS parameter field of a neighbor AP |
| 11 | TBTT offset field, BSSID field, and short SSID field of a neighbor AP |
| 12 | TBTT offset field, BSSID field, short SSID field, and BSS parameter field of a neighbor AP |
| 0, 9-10 | Reserved |
| 13-255 | Reserved, but information about first 12 bytes is the same as the fields carried when the TBTT information length is 12. |

The following provides a specific format of the TBTT information (TBTT information) field present when the TBTT information length is 12 bytes.

Neighbor AP TBTT offset (TBTT offset of the neighbor AP) field: indicates an offset of a Beacon sending time between the neighbor AP and the reporting AP:

a BSSID (BSS identifier) field, indicating a BSS identifier corresponding to the neighbor AP;

a short SSID (short service set identifier) field, indicating a service set identifier to which the neighbor AP belongs; and a BSS parameter (BSS parameter) field, indicating a related parameter of a neighbor AP.

Optionally, in addition to the neighbor AP TBTT offset field, the BSSID field, the short SSID field, and the BSS parameter field, one TBTT information field in the RNR element in this embodiment of this application includes: at least one of a critical BSS parameter update count value field, a link identifier (link ID) field, and a multi-link device identifier (MLD ID) field.

Figure 8B:
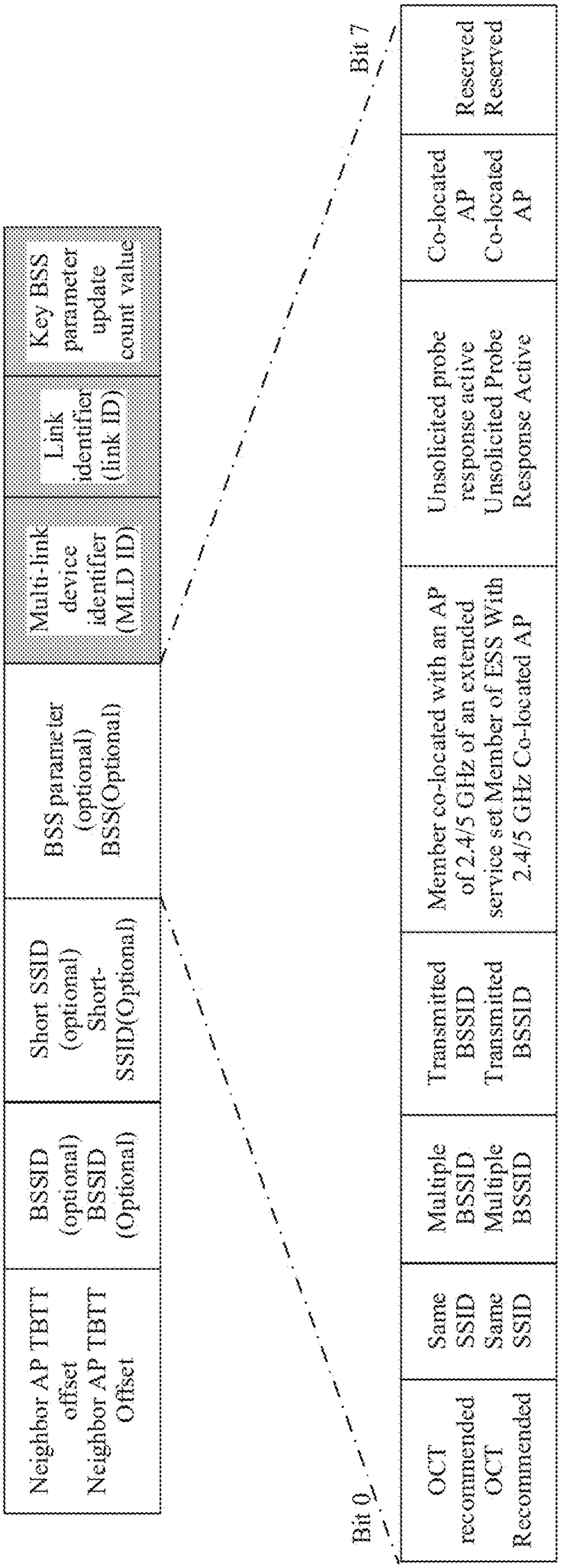
FIG. 8*b* is a schematic diagram of a frame structure of a TBTT information field in an RNR element according to an embodiment of this application.

FIG. 8*b* is a schematic diagram of a frame structure of a TBTT information field in an RNR element according to an embodiment of this application. As shown in FIG. 8*b*, one TBTT information field of the RNR element includes at least one of the following fields: a neighbor AP TBTT offset field, a BSSID field, a short SSID field, a BSS parameter field, a critical BSS parameter update count value field, a link identifier (link ID) field, and a multi-link device identifier (MLD ID) field. It may be understood that FIG. 8*b* is merely an example, and a sequence of the critical BSS parameter update count value field, the link ID field, and the MLD ID field that are included in the TBTT information field, and whether there is another field between the critical BSS parameter update count value field, the link ID field, and the MLD ID field are not limited.

It may be understood that the three fields: the critical BSS parameter update count value field, the link identifier field, and the MLD identifier field are independent, and may be all carried in the RNR element, or may not be all carried in the RNR element. In other words, the RNR element may carry some of the three fields.

The critical BSS parameter update count value field indicates the critical BSS parameter update count value. The link identifier field indicates a specific link. The MLD ID field indicates a specific AP MLD. It may be understood that one TBTT information field corresponds to one AP, one AP manages one BSS, and each TBTT information field carries an MLD ID field and a link identifier field. Therefore, when a first frame is used, even if an AP MLD includes a plurality of APs in one BSS, different APs in the AP MLD may be distinguished based on a link indicated by the link identifier field and an MLD indicated by the MLD ID field. In other words, the link identifier field in combination with the MLD ID field may uniquely identify an AP.

The BSS parameter field indicates a related parameter of the neighbor AP. Specifically, a related parameter of the neighbor AP includes the following information:

an OCT recommended (on-channel tunneling mechanism recommended) field, indicating that the neighbor AP expects to exchange an MPDU of a management type with the reporting AP by using the OCT mechanism;

a same SSID (same service set identifier) field, indicating whether the neighbor AP and the reporting AP have a same SSID;

a multiple BSSID (multiple basic service set identifier) field, indicating whether the neighbor AP is a part of a multiple BSSID set;

a transmitted BSSID (transmitted basic service set identifier) field indicating, whether the neighbor AP is a transmitted BSSID or a nontransmitted BSSID if the neighbor AP is a part of the multiple BSSID set;

a member of ESS with 2.4/5 GHz co-located AP (member of extended service set with 2.4/5 GHz co-located AP)

field, indicating whether the neighbor AP is a member of an extended service set with 2.4/5 GHz co-located AP (that is, whether the neighbor AP is a 6 GHz only AP);

an unsolicited probe response active (unsolicited probe response active) field, indicating whether the neighbor AP enables an active probe response; and a co-located AP (co-located AP) field, indicating whether the neighbor AP and the reporting AP are co-located.

It should be noted that, in this embodiment of this application, an AP described in a neighbor report element (Neighbor Report element) or a reduced neighbor report element is a reported AP (reported access point (AP): An AP that is described in an element such as a Neighbor Report element or a Reduced Neighbor Report element.), and a neighbor AP mentioned subsequently may be understood as the reported AP. An AP that sends the neighbor report element or the reduced neighbor report element is a reporting AP (reporting access point (AP): An AP that is transmitting an element, such as a neighbor report element or a reduced neighbor report element, describing a reported AP).

The RNR element is described in the foregoing content. The following describes a second AP MLD.

Optionally, the second AP MLD is an AP MLD to which a nontransmitted AP in the multiple BSSID set including the first AP belongs.

For example, as shown in FIG. 4, it is assumed that an AP 1*x* is a first AP. The first AP sends a management frame, for example, a beacon frame or a probe response frame, and carries an RNR element. The RNR element carries critical BSS parameter update count values of a plurality of APs in a first AP MLD, and critical BSS parameter update count values of a plurality of APs in a second AP MLD. An AP MLD 1 is the first AP MLD, and an AP MLD 3 is the second AP MLD. Therefore, the first frame includes critical BSS parameter update count values corresponding to the plurality of APs in the AP MLD 1, for example, includes a critical BSS parameter update count value corresponding to an AP 2*y* and a critical BSS parameter update count value corresponding to an AP 3. The first frame further includes critical BSS parameter update count values corresponding to the plurality of APs in the AP MLD 3, for example, includes a critical BSS parameter update count value corresponding to an AP 1*y*, a critical BSS parameter update count value corresponding to an AP 2*z*, and a critical BSS parameter update count value corresponding to an AP 4*y*. Optionally, the management frame sent by the first AP further includes a critical BSS parameter update count value corresponding to an AP 1*x*. The critical BSS parameter update count value of the AP 1*x* is located in MLD common information of a multi-link (multi-link, ML) element or in an EHT operation element. An MLD common information field or the EHT operation element in the ML element further carries a link identifier of the first AP, that is, the AP 1*x*.

For another example, as shown in FIG. 4, it is assumed that an AP 2*x* is the first AP, the AP MLD 2 is the first AP MLD, and both the AP MLD 1 and the AP MLD 3 are the second AP MLD. Therefore, the first frame includes critical BSS parameter update count values corresponding to a plurality of APs in the AP MLD 2, for example, includes a critical BSS parameter update count value corresponding to an AP 4*x*. The first frame further includes critical BSS parameter update count values corresponding to the plurality of APs in the AP MLD 1, for example, includes the critical BSS parameter update count value corresponding to the AP 1*x*, the critical BSS parameter update count value corresponding to the AP 2*y*, and the critical BSS parameter update count value corresponding to the AP 3. The first frame further includes critical BSS parameter update count values corresponding to a plurality of APs in the AP MLD 3, for example, includes the critical BSS parameter update count value corresponding to the AP 1*y*, the critical BSS parameter update count value corresponding to the AP 2*z*, and the critical BSS parameter update count value corresponding to the AP 4*y*. Optionally, the management frame sent by the first AP further includes the critical BSS parameter update count value corresponding to the AP 2*x*. The critical BSS parameter update count value of the AP 2*x* is located in the ML element common MLD common information or the EHT operation element. The MLD common information field or the EHT operation element in the ML element further carries the link identifier of the first AP, that is, the AP 2*x*.

For another example, as shown in FIG. 4, it is assumed that AP the 4*x* is the first AP, the AP MLD 2 is the first AP MLD, and both the AP MLD 3 and an AP MLD 4 are the second AP MLD. Therefore, the first frame includes critical BSS parameter update count values corresponding to a plurality of APs in the AP MLD 2, for example, includes a critical BSS parameter update count value corresponding to the AP 2*x*. The first frame further includes critical BSS parameter update count values corresponding to the plurality of APs in the AP MLD 3, for example, includes the critical BSS parameter update count value corresponding to the AP 1*y*, the critical BSS parameter update count value corresponding to the AP 2*z*, and the critical BSS parameter update count value corresponding to the AP 4*y*. The first frame further includes critical BSS parameter update count values corresponding to a plurality of APs in the AP MLD 4, for example, includes the critical BSS parameter update count value corresponding to the AP 4*z* and the critical BSS parameter update count value corresponding to an AP 5. Optionally, the management frame sent by the first AP further includes the critical BSS parameter update count value corresponding to the AP 4*x*. The critical BSS parameter update count value of the AP 4*x* is located in the ML element common MLD common information or the EHT operation element. The MLD common information field or the EHT operation element in the ML element further carries the link identifier of the first AP, that is, the AP 4*x*.

For another example, as shown in FIG. 4, it is assumed that the AP 3 is the first AP, the AP MLD 1 is the first AP MLD, and there is no second AP MLD. Therefore, the first frame includes the critical BSS parameter update count values corresponding to the plurality of APs in the AP MLD 1, for example, includes the critical BSS parameter update count value corresponding to the AP 1*x* and the critical BSS parameter update count value corresponding to the AP 2*y*. Optionally, the management frame sent by the first AP further includes the critical BSS parameter update count value corresponding to the AP 3. The BSS parameter update count value of the AP 3 is located in the ML element common MLD common information or the EHT operation element. The MLD common information field or the EHT operation element in the ML element further carries the link identifier of the first AP, that is the AP 3.

S102: The first AP in the first AP MLD sends the first frame on a link on which the first AP works.

Specifically, the first AP in the first AP MLD needs to send, on the link on which the first AP MLD works, the first frame to a non-AP MLD associated with the first AP MLD or a station around the first AP. A station around the first AP includes a station managed by the first AP and an unassociated station. The following uses the station managed by the AP as an example to describe the critical BSS parameter management method applicable to multiple links in this embodiment of this application. It may be understood that the first frame may be sent in a broadcast or multicast manner.

It may be further understood that the non-AP MLD associated with the first AP MLD in this embodiment of this application has two meanings: (1) All non-AP MLDs that establish a multi-link association with the first AP MLD. The non-AP MLD may establish associations with some APs in the first AP MLD, or may establish associations with all APs. (2) A non-AP MLD associated with the first AP in the first AP MLD exists. Thenon-AP MLD may establish associations with some APs in the first AP MLD, or may establish associations with all APs, but the some APs or all the APs need to include the first AP. The first AP is a reporting AP.

S103: A first STA of the non-AP MLD receives the first frame on a link on which the first STA works.

The first STA may be a station managed by the first AP or a station around the first AP, and may learn whether a critical BSS parameter of a BSS to which the first STA belongs is updated. The first STA and the first AP work on a same link/a same frequency band/a same channel.

S104: The first STA of the non-AP MLD determines, based on the first frame, whether critical BSS parameters of a plurality of BSSs managed by a plurality of APs in an AP MLD associated with the non-AP MLD are updated.

Specifically, after receiving the first frame, the first STA of the non-AP MLD may parse the first frame to obtain critical BSS parameter update count values corresponding to the plurality of APs in the first AP MLD and the critical BSS parameter update count values corresponding to the plurality of APs in the second AP MLD. The non-AP MLD parses, from the first frame, M critical BSS parameter update count values corresponding to M APs (the M APs have an association relationship with the non-AP MLD) in the AP MLD associated with the non-AP MLD. For each AP in the M APs, the non-AP MLD compares, a value relationship between a critical BSS parameter update count value received this time and a critical BSS parameter update count value received last time; or compares whether the critical BSS parameter update count value received this time is the same as the critical BSS parameter update count value received last time. If the critical BSS parameter update count value received this time is different from the critical BSS parameter update count value received last time, the non-AP MLD determines that the critical BSS parameter in the BSS managed by the AP is updated. Optionally, when the critical BSS parameter update count value received this time is different from the critical BSS parameter update count value received last time, the non-AP MLD may listen to the beacon frame on the link on which the AP works. The beacon frame carries a latest critical BSS parameter of the AP. Alternatively, a STA of the non-AP MLD may obtain a latest critical BSS parameter of the AP by sending a probe request frame with reference to the foregoing description.

If the critical BSS parameter update count value received this time is the same as the critical BSS parameter update count value received last time, it indicates that the BSS managed by the AP does not update the critical BSS parameter, and the non-AP MLD may not perform processing.

Optionally, each time the non-AP MLD records a critical BSS parameter update count value corresponding to each link received last time.

For example, as shown in FIG. 4, it is assumed that the first AP is the AP 1*x*, the AP MLD 1 is the first AP MLD, and the AP MLD 3 is the second AP MLD. It is assumed that the non-AP MLD 1 is associated with the AP 1*y*, the AP 2*z*, and the AP 4*y* of the AP MLD 3, Mis equal to 3, and APs associated with the non-AP MLD 1 are the AP 1*y*, the AP 2*z*, and the AP 4*y*. The first frame includes the critical BSS parameter update count value corresponding to the AP 1*x* of the AP MLD 1, the critical BSS parameter update count value corresponding to the AP 2*y*, and the critical BSS parameter update count value corresponding to the AP 3. The first frame further includes the critical BSS parameter update count value corresponding to the AP 1*y*, the critical BSS parameter update count value corresponding to the AP 2*z*, and the critical BSS parameter update count value corresponding to the AP 4*y* of the AP MLD 3. In other words, N is equal to 6. The non-AP MLD 1 parses, from the first frame, three critical BSS parameter update count values corresponding to the AP 1*y*, the AP 2*z*, and the AP 4*y* in the AP MLD 3 associated with the non-AP MLD 1. For the AP 1*y*, a non-AP MLD 2 compares whether the critical BSS parameter update count value corresponding to the AP 1*y* received this time is the same as the critical BSS parameter update count value corresponding to the AP 1*y* received last time. If the critical BSS parameter update count value corresponding to the AP 1*y* received this time and the critical BSS parameter update count value corresponding to the AP 1*y* received last time are different, it indicates that critical BSS parameters of the BSS managed by the AP 1*y* are updated. The non-AP MLD 1 may listen to, on a link 1 on which the AP 1*y* is located, a beacon frame carrying a latest critical BSS parameter. For the AP 2*z*, the non-AP MLD 1 compares whether the critical BSS parameter update count value corresponding to the AP 2*z* received this time is the same as the critical BSS parameter update count value corresponding to the AP 2*z* received last time. If the critical BSS parameter update count value corresponding to the AP 2*z* received this time and the critical BSS parameter update count value corresponding to the AP 2*z* received last time are different, it indicates that critical BSS parameters of the BSS managed by the AP 2*z* are updated. The non-AP MLD 1 may listen to, on a link 2 on which the AP 2*z* is located, the beacon frame carrying the latest critical BSS parameter. For the AP 4*y*, the non-AP MLD 1 compares whether the critical BSS parameter update count value corresponding to the AP 4*y* received this time is the same as the critical BSS parameter update count value corresponding to the AP 4*y* received last time. If the critical BSS parameter update count value corresponding to the AP 4*y* received this time and the critical BSS parameter update count value corresponding to the AP 4*y* received last time are different, it indicates that critical BSS parameters of the BSS managed by the AP 4*y* are updated. The non-AP MLD 1 may listen to, on a link 4 on which the AP 4*y* is located, the beacon frame carrying the latest critical BSS parameter.

For another example, it is assumed that the non-AP MLD 2 is associated with the AP 1*y* and the AP 4*y* of the AP MLD 3. In this case, M is equal to 2, and APs that have an association relationship with the non-AP MLD 2 are the AP 1*y* and the AP 4*y*. Therefore, for the AP 1*y*, the non-AP MLD 2 compares whether the critical BSS parameter update count value corresponding to the AP 1*y* received this time is the same as the critical BSS parameter update count value corresponding to the AP 1*y* received last time. If the critical BSS parameter update count value corresponding to the AP 1*y* received this time and the critical BSS parameter update count value corresponding to the AP 1*y* received last time are different, it indicates that the critical BSS parameters of the BSS managed by the AP 1*y* are updated. The non-AP MLD 2 may listen to, on a link 1 on which the AP 1*y* is located, a beacon frame carrying a latest critical BSS parameter. For the AP 4*y*, the non-AP MLD 2 compares whether the critical BSS parameter update count value corresponding to the AP 4*y* received this time is the same as the critical BSS parameter update count value corresponding to the AP 4*y* received last time. If the critical BSS parameter update count value corresponding to the AP 4*y* received this time and the critical BSS parameter update count value corresponding to the AP 4*y* received last time are different, it indicates that the critical BSS parameters of the BSS managed by the AP 4*y* are updated. The non-AP MLD 2 may listen to, on the link 4 on which the AP 4*y* is located, the beacon frame carrying the latest critical BSS parameter.

It may be understood that when the first STA is a single-link STA, when the first STA switches from one link to another link for working, the first STA may obtain a critical BSS parameter update count value by using the method in this embodiment of this application.

It can be learned that in this embodiment of this application, by using the first frame sent by the first AP, not only critical BSS parameter update count values corresponding to the plurality of APs in the first AP MLD, but also critical BSS parameter update count values corresponding to the plurality of APs in the second AP MLD are indicated. This implements that one AP helps a plurality of APs in another AP MLD to indicate corresponding critical BSS parameter update count values, so that a STA can compare a currently received critical BSS parameter update count value with a critical BSS parameter update count value received last time, and check whether a critical BSS parameter is updated. Therefore, the STA can be assisted in receiving a latest critical BSS parameter, and a non-AP MLD associated with the second AP MLD can listen on a link on which a nontransmitted AP in the second AP MLD works, and can also work normally. In other words, for the non-AP MLD, there may be more to-be-listened channels for selection. In 802.11be, it is possible that all or some APs in an AP MLD are nontransmitted APs. Therefore, the solution provided in this embodiment of this application can resolve a problem that some nontransmitted APs cannot send a management frame to notify that a critical BSS parameter is updated. Therefore, integrity and diversity of a critical BSS parameter update indication can be improved.

In an optional embodiment, a method for each non-AP MLD to obtain initial values of the critical BSS parameter update count values of the plurality of APs in the AP MLD associated with the non-AP MLD is as follows.

1. In an association phase, an association response frame sent by one AP in the AP MLD carries current critical BSS parameter update count values of the plurality of APs in the AP MLD.
2. When a STA in the non-AP MLD requests to switch to another link to work, channel switching signaling implicitly indicates to request, from the AP MLD, a critical BSS parameter update count value of an AP working on the link. A response frame with which the associated AP MLD replies on the link corresponding to the STA needs to carry a latest critical BSS parameter update count value of the AP working on the another link at this time.

The channel switching signaling includes a link identifier corresponding to the AP to which the STA needs to switch. For example, as shown in FIG. 4, it is assumed that a STA 1 in a non-AP MLD 1 requests to switch from a link 1 to a link 2, and the channel switching signaling includes a link identifier of the link 2. It is assumed that the non-AP MLD 1 is associated with the AP MLD, the channel switching signaling implicitly indicates to request, from the AP MLD 1, a critical BSS parameter update count value of the AP 2*y* working on the link 2. The response frame returned by the AP MLD 1 on the link 1 corresponding to the STA 1 needs to carry the latest critical BSS parameter update count value of the AP 2*y* working on the link 2 at this time.

When the received critical BSS parameter update count value sent by the AP is different from the critical BSS parameter update count value received last time, in addition to acquiring a latest critical BSS parameter by receiving a beacon frame and sending a probe request, a locally stored critical BSS parameter update count value needs to be updated to a critical BSS parameter update count value received this time.

In another optional embodiment, one AP MLD has a common SSID, and optionally, each AP has a separate SSID. In an MLD discovery phase of neighbor APs or APs, the non-AP MLD can discover an optimal AP MLD as soon as possible for association, including discovering a preferred SSID. For a reported AP (that is, a neighboring AP) in the AP MLD, a short SSID field of each reported AP (that is, a neighboring AP) in the RNR element in this embodiment of this application carries: a short SSID calculated based on an SSID of the AP MLD on which the reported AP (that is, the neighboring AP) is located. For details about how to calculate the short SSID, refer to the 802.11-2016 protocol.

It may be understood that this embodiment of this application may be separately implemented, or may be implemented with reference to the method shown in FIG. 7. This is not limited in this embodiment of this application.

It can be learned that in comparison with a case on which the short SSID of the reported AP is directly carried in the RNR element, in the non-AP MLD in this embodiment of this application, an optimal AP MLD can be quickly selected for association in a discovery phase by using a short SSID of the AP MLD to which the reported AP belongs, thereby improving association efficiency.

In still another optional embodiment, the first frame may be further used to indicate specific critical BSS parameters of the plurality of APs in the first AP MLD and specific critical BSS parameters of the plurality of APs in the second AP MLD. The specific critical BSS parameter is a BSS parameter related to a channel change. The specific critical BSS parameters may include one or more of the following: an inclusion of a channel switch announcement element, an inclusion of an extended channel switch announcement element, an inclusion of a wide bandwidth channel switch element, and an inclusion of a channel switch wrapper element.

Embodiment 2

Embodiment 2 of this application provides a method for updating a critical BSS parameter, applied to a multi-link device, to describe how to update a critical BSS parameter. It may be understood that, in actual application, Embodiment 2 of this application may be separately implemented, or may be implemented with reference to Embodiment 1. This is not limited in this application.

Figure 9:
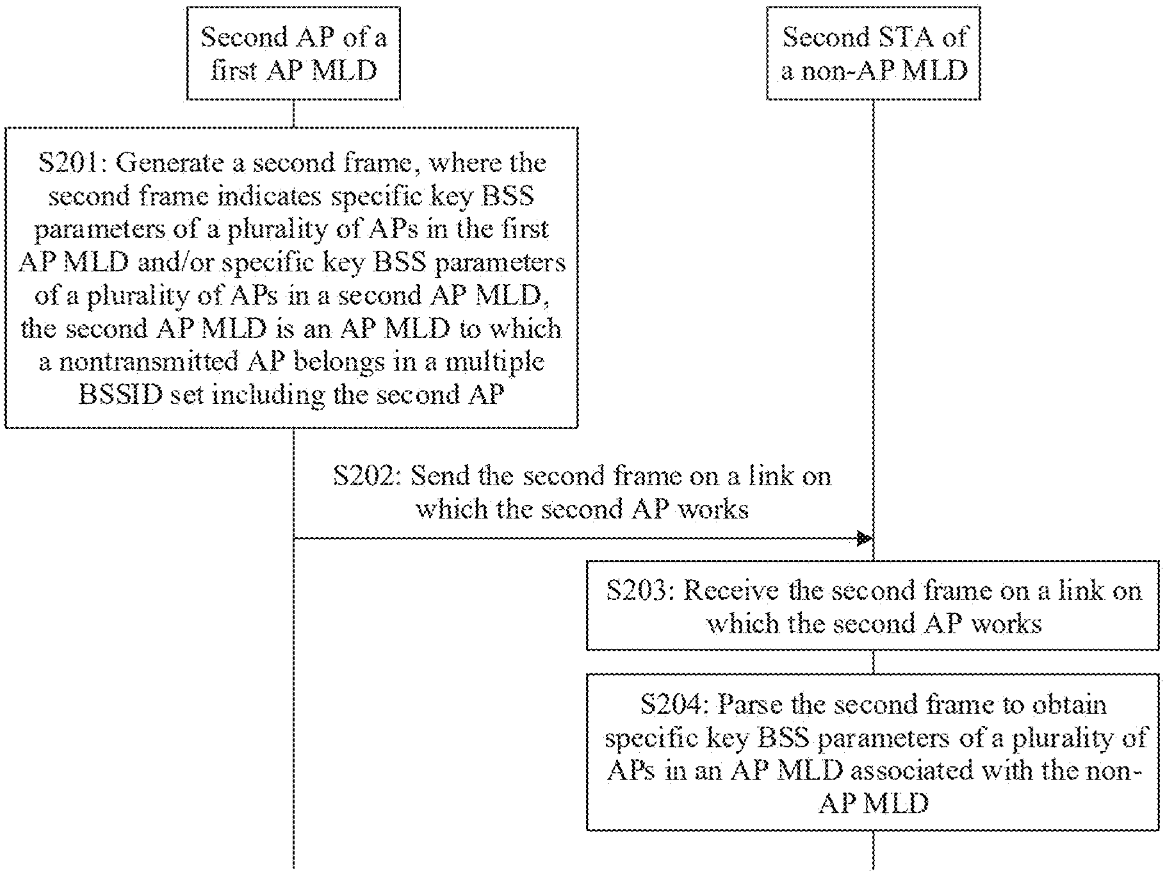
FIG. 9 is a schematic flowchart of a method for updating a critical BSS parameter according to an embodiment of this application.

FIG. 9 is a schematic flowchart of a method for updating a critical BSS parameter according to an embodiment of this application. An AP MLD includes one or more APs, a second AP is any AP in the AP MLD, and the second AP may be a reporting AP or may not be a reporting AP. The second STA may be a single-link STA, or may be any STA in a non-AP MLD. For ease of description, the following uses a second STA in the non-AP MLD as an example. The second AP and the second STA work on a same link. As shown in FIG. 9, the method for updating a critical BSS parameter includes but is not limited to the following steps.

S201: A second AP in a first AP MLD generates a second frame, where the second frame indicates specific critical BSS parameters of a plurality of APs in the first AP MLD and/or specific critical BSS parameters of a plurality of APs in a second AP MLD, and the second AP MLD is an AP MLD to which a nontransmitted AP belongs in a multiple BSSID set including the second AP.

The second frame may be a management frame such as a beacon frame, or may be another frame. The second frame and the first frame in Embodiment 1 may be one frame, or may be different frames. This is not limited in this embodiment of this application. The second frame may indicate specific critical BSS parameters of the plurality of APs in the first AP MLD (the plurality of APs herein are all APs in the first AP MLD, or all APs or some APs in the first AP MLD except the first AP), and/or specific critical BSS parameters of the plurality of APs in the second AP MLD (the plurality of APs herein are all or some APs in the second AP MLD).

The specific critical BSS parameter may include one or more of the following: an inclusion of a channel switch announcement element (Inclusion of a Channel Switch Announcement element), an inclusion of an extended channel switch announcement element (Inclusion of an Extended Channel Switch Announcement element), an inclusion of a wide bandwidth channel switch element (Inclusion of a Wide Bandwidth Channel Switch element), and an inclusion of a channel switch wrapper element (Inclusion of a Channel Switch Wrapper element). If all or some of the foregoing four elements are changed/updated, but a station does not learn of the change/update in time (possibly because the station does not receive the updated elements), the station cannot find a corresponding AP in the AP MLD. As a result, a terminal cannot communicate with a corresponding AP in the AP MLD. Therefore, the specific critical BSS parameter needs to be carried.

Optionally, the specific critical BSS parameter may further include one or more an inclusion of a quiet element (Inclusion of a Quiet element) and an inclusion of a quiet channel element (Inclusion of a Quiet Channel element). Optionally, the specific critical BSS parameter may further include one or more of a modification of an EDCA parameter element, a modification of a DSSS parameter set, a modification of the CF parameter set element, a modification of the HT operation element, an inclusion of an operating mode notification element, a modification of the VHT operation element, a modification of the HE operation element, an insertion of a broadcast TWT element, an inclusion of the BSS color change announcement element, a modification of the MU EDCA parameter set element, and a modification of the spatial reuse parameter set element. One or more of the foregoing specific critical BSS parameters may also be listed as a critical parameter of a link.

Optionally, the specific critical BSS parameter may be carried in AP information of a multi-link (multi-link, ML) element of the second frame. The specific critical BSS parameter of each AP is carried in the respective AP information of the ML element.

The following describes a multi link element.

Figure 10A:
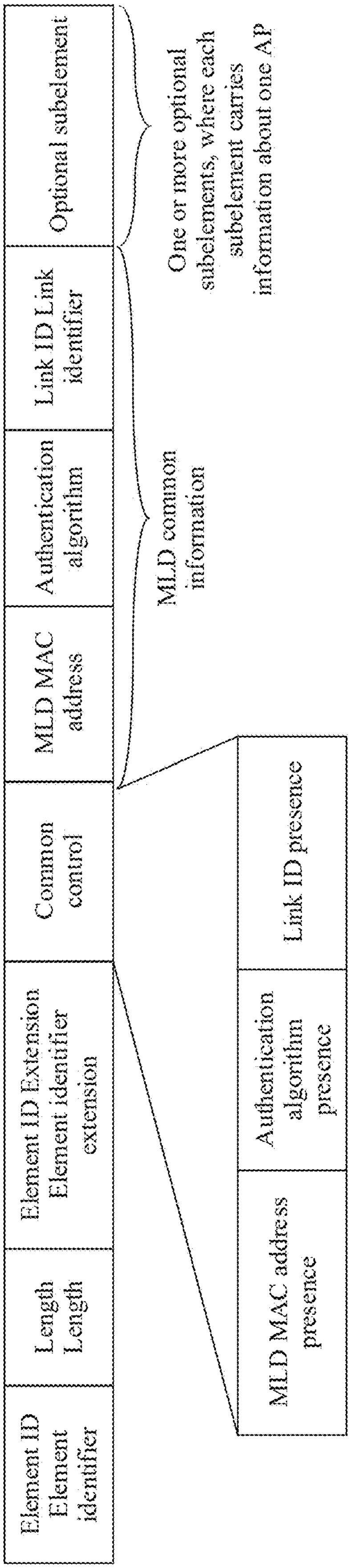
FIG. 10*a* is a schematic diagram of a frame structure of an ML element according to an embodiment of this application.

FIG. 10*a* is a schematic diagram of a frame structure of an ML element according to an embodiment of this application. As shown in FIG. 10*a*, the ML element includes a common control field, MLD common information, and one or more optional subelements. Optionally, the MLD common information includes an MLD MAC address field, and optionally includes an authentication algorithm field and a link identifier (link ID) field. The MLD MAC address field indicates an address of the MLD, and the address is used to identify the MLD. Optionally, the address of the MLD is a MAC address (address) of the MLD. In other words, the MAC address is used to identify an AP MLD management entity (management entity). The MAC address of the AP MLD may be the same as one MAC address of n APs included in the AP MLD, or may be different from all MAC addresses of the n APs. For example, the MAC address of the AP MLD is a public MAC address, and may identify the AP MLD.

Optionally, the common control field may include an MLD MAC address existence field (or referred to as an MLD MAC address presence field or an MLD MAC address presence identifier), used to indicate whether there is the MLD MAC address field in the MLD common information. Optionally, the common control field further includes an authentication algorithm presence field, to indicate whether there is an authentication algorithm field in the MLD common information. Optionally, the "presence field" may include one bit. A first value indicates that a corresponding field is present, and a second value indicates that the corresponding field is not present. For example, the first value is 1, and the second value is 0. Optionally, the common control field further includes a link ID presence field, used to indicate whether there is the link ID field in the MLD common information.

Optionally, one ML element further includes one or more subelements, and one subelement describes information about one AP in one AP MLD. Content of each subelement includes a link identifier of the AP. Optionally, each subelement further includes fields related to the AP, such as an SSID field, a timestamp (timestamp) field, a beacon interval field, and an element of the AP. The element of the AP is, for example, a BSS load element, an EHT capability element, or an EHT operation element.

Figure 10B:
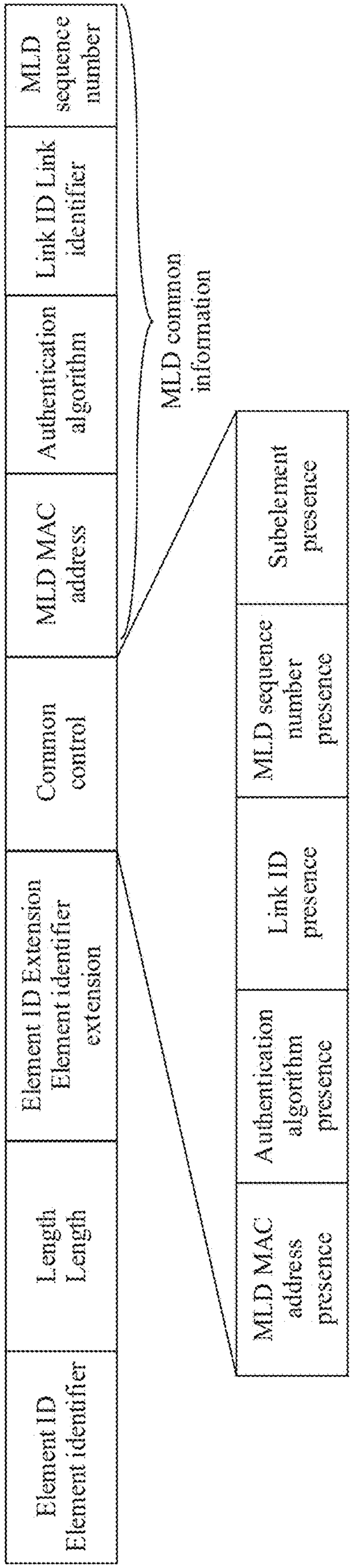
FIG. 10*b* is a schematic diagram of a first part of a frame structure of an ML element according to an embodiment of this application.

FIG. 10*b* is a schematic diagram of a first part of a frame structure of an ML element according to an embodiment of this application. As shown in FIG. 10*b*, FIG. 10*b* shows the first part of the ML element, which does not include the subelement of the AP information in the AP MLD. The first part of the ML element includes a common control field and MLD common information. The common control field includes one or more or all of an MLD MAC address presence field, a link ID presence field, an MLD sequence number presence field, and a subelement presence field. Optionally, an authentication algorithm presence field is included. The MLD MAC address presence field indicates whether the MLD common information includes an MLD MAC address field. The link ID presence field is used to indicate whether the MLD public information includes the Link ID field. The MLD sequence number presence field indicates whether the MLD common information includes an MLD sequence number field. The foregoing fields may be separately indicated by using one bit. For example, 1 indicates that the field is present, and 0 indicates that the field is not present. Alternatively, two values of one field are separately used for indication, where a first value indicates that the field is present, and a second value indicates that the field is not present.

Optionally, the first part (herein refers to the common control field and the MLD common information shown in FIG. 10*a*) of the ML element shown in FIG. 10*a* may alternatively be the first part (herein refers to the common control field and the MLD common information shown in FIG. 10*b*) of the ML element shown in FIG. 10*b*. The AP MLD may be used to provide further detailed information for a station non-AP MLD, for example, placed in a probe response frame or an association response frame. Optionally, the common control field includes an MLD common information presence field, used to indicate whether the MLD common information is present, or whether a field other than the MLD MAC address or the MLD sequence number in the MLD common information is present, to help further reduce repeated information (it is assumed that the non-AP MLD has learned an authentication algorithm and a link identifier) . In a beacon frame, to avoid excessive content in the beacon frame and avoid repetition of information about each AP in an RNR element, the beacon frame needs to carry only the MLD common information in the ML element or some fields in the MLD common information. In this case, the common control field includes a subelement presence field, meaning that a subelement used to indicate specific information of a plurality of APs in the ML element is not present, as shown in FIG. 10*b*.

If the reporting AP belongs to a multiple BSSID set, the reporting AP further needs to send a plurality of BSSID elements, including a nontransmitted profile (nontransmitted profile), to indicate information about one or more nontransmitted APs. If one nontransmitted AP comes from one AP MLD, the first part of the ML element shown in FIG. 10*b* or a complete part of the ML element shown in FIG. 10*a* may be further placed in information about the nontransmitted AP.

The following describes several elements included in the specific critical BSS parameter.

FIG. 11*a* is a schematic diagram of a frame structure of an inclusion of a channel switch announcement element according to an embodiment of this application. As shown in FIG. 11*a*, the inclusion of a channel switch announcement element includes a channel switch mode (Channel Switch Mode) field, a new channel number (New Channel Number) field, and a channel switch count (Channel Switch Count) field. The channel transformation mode field indicates a transmission restriction before channel switch (The Channel Switch Mode field indicates any restrictions on transmission until a channel switch). The new channel number field indicates a number of a channel to which a station is to be switched (The New Channel Number field is set to the number of the channel to which the STA is moving). The channel switch count field indicates how many TBTTs (beacon frame target transmission time, target beacon transmission time) are required by the station to send the element to switch to the channel. If the channel switch count field is set to 0, it indicates that the switch occurs before a next TBTT. If the channel switch count field is set to 1, it indicates that the switch may occur at any time after the element is sent (the Channel Switch Count field indicates the number of target beacon transmission times (TBTTs) until the STA sending the Channel Switch Count field switches to the new channel. A Channel Switch Count field set to 1 indicates that the switch occurs immediately before the next TBTT. A Channel Switch Count field set to 0 indicates that the switch occurs any time after the frame containing the Channel Switch Count field is transmitted.).

FIG. 11*b* is a schematic diagram of a frame structure of an inclusion of an extended channel switch announcement element according to an embodiment of this application. As shown in FIG. 11*b*, the inclusion of an extended channel switch announcement element includes a channel switch mode (Channel Switch Mode) field, a new operating class (New Operating Class) field, a new channel number (New Channel Number) field, and a channel switch count (Channel Switch Count) field. The channel switch mode field indicates a transmission restriction before channel switch. The new operating class field indicates an operation set to which the station is switched (The New Operating Class field is set to the number of the operating class after the channel switch). The new channel number field indicates a number of a channel to which the station is to be switched. The channel switch count field indicates a quantity of TBTTs required from sending an element by the station to switching to the channel. If the channel switch count field is set to 0, it indicates that the switch occurs before a next TBTT. If the channel switch count field is set to 1, it indicates that the switch may occur at any moment after the element is sent.

FIG. 11*c* is a schematic diagram of a frame structure of an inclusion of a wide bandwidth channel switch element according to an embodiment of this application. As shown in FIG. 11*c*, the inclusion of a wide bandwidth channel switch element includes a new channel bandwidth (New Channel Width) field, a new channel center frequency segment 0 (New Channel Center Frequency Segment 0) field, and a new channel center frequency segment 1 (New Channel Center Frequency Segment 1) field. The new channel bandwidth field defines a BSS bandwidth (New Channel Width define BSS bandwidth). The new channel center frequency segment 0 defines a center frequency of a BSS bandwidth of 20, 40, 80, 160, or 80+80 MHz (New Channel Center Frequency Segment 0 Defines a channel center frequency for a 20, 40, 80, 160, or 80+80 MHz BSS). The new channel center frequency segment 1 defines a center frequency of a BSS bandwidth of 160 or 80+80 MHz (New Channel Center Frequency Segment 1 Defines a channel center frequency for a 160 or 80+80 MHz BSS).

FIG. 11*d* is a schematic diagram of a frame structure of a quiet element (Quiet element) according to an embodiment of this application. As shown in FIG. 11*d*, the quiet element includes a quiet count (Quiet Count) field, a quiet period (Quiet Period) field, a quiet duration (Quiet Duration) field, and a quiet offset (Quiet Offset) field. The quiet count field is set to a quantity of TBTTs, until a beacon interval during which a next quiet interval starts (The Quiet Count field is set to the number of TBTTs until the beacon interval during which the next quiet interval starts). The quiet period field is set to a quantity of beacon frame intervals between the start of regularly scheduled quiet intervals defined by the quiet element. The quiet period field set to 0 indicates that no periodic quiet interval is defined (The Quiet Period field is set to the number of beacon intervals between the start of regularly scheduled quiet intervals defined by this Quiet element. A Quiet Period field set to 0 indicates that no periodic quiet interval is defined). The quiet duration field is set to a duration of the quiet interval, in units of TUs (The Quiet Duration field is set to the duration of the quiet interval, expressed in TUs). The quiet offset field is set to an offset of the start of the quiet interval from the TBTT specified by the quiet count field, in units of TUs. A value of the quiet offset field is less than one beacon frame interval (The Quiet Offset field is set to the offset of the start of the quiet interval from the TBTT specified by the Quiet Count field, expressed in TUs. The value of the Quiet Offset field is less than one beacon interval).

It may be understood that, after the quiet element takes effect, the AP no longer communicates with the STA, and the STA maintains a quiet state, so that the STA may perform another operation.

Optionally, the second AP MLD is an AP MLD to which a nontransmitted AP in the multiple BSSID set including the second AP belongs. Specifically, for a meaning of the second AP MLD, refer to the related description in the foregoing Embodiment 1.

S202: The second AP in the first AP MLD sends the second frame on a link on which the second AP works.

The second AP in the first AP MLD needs to send, on the link on which the second AP MLD works, the second frame to a non-AP MLD associated with the first AP MLD or a station around the second AP. The station around the second AP includes a station managed by the second AP and an unassociated station. It may be understood that the second frame may be sent in a broadcast, multicast, or unicast manner.

S203: A second STA of the non-AP MLD receives the second frame on a link on which the second STA works.

The second STA may be a station managed by the second AP or a station around the second AP, and may learn of specific critical BSS parameters of a plurality of APs in an AP MLD associated with an MLD including the first STA. The second STA and the second AP work on a same link/a same frequency band/a same channel.

S204: The second STA of the non-AP MLD parses the second frame to obtain specific critical BSS parameters of a plurality of APs in an AP MLD associated with the non-AP MLD.

Specifically, after receiving the second frame, the second STA of the non-AP MLD may parse the second frame, to obtain, from an ML element of the second frame, specific critical BSS parameters of K APs (the K APs have an association relationship with the non-AP MLD, and K is a positive integer) in the AP MLD associated with the non-AP MLD. For a specific critical BSS parameter of each AP in the K APs, the non-AP MLD may adjust, based on an indication of the specific critical BSS parameter of each AP, channel information of a STA corresponding to each AP.

For example, as shown in FIG. 4, it is assumed that the AP 2*x* is the second AP, the AP MLD 2 is the first AP MLD, and both the AP MLD 1 and the AP MLD 3 are the second AP MLD. It is assumed that the non-AP MLD 1 is associated with the AP 1*x* and the AP 2*y* of the AP MLD 1, K is equal to 2, and APs that have an association relationship with the non-AP MLD 1 are the AP 1*x* and the AP 2*y*. The second frame separately carries specific critical BSS parameters of a plurality of APs (which may be all APs or some APs) in the AP MLD 1, the AP MLD 2, and the AP MLD 3. For example, the second frame carries specific critical BSS parameters of all the APs in the AP MLD 1, and also carries specific critical parameters of all the APs in the AP MLD 2 and the AP MLD 3. Therefore, for the AP 1*x* in the AP MLD 1, it is assumed that the specific critical BSS parameter of the AP 1*x* indicates that the channel number to which the station is to switch is 9, the non-AP MLD 1 switches, based on the indication of the specific critical BSS parameter of the AP 1*x*, a STA corresponding to the AP 1*x* to a channel on which the channel number 9 is located for communication. For the AP 2*y* in the AP MLD 1, it is assumed that a specific critical BSS parameter of the AP 2*y* indicates that an operating class to which the station is to switch is A, the non-AP MLD 1 changes, based on an indication of the specific critical BSS parameter of the AP 2*y*, a STA corresponding to AP 2*y* from a current operating class to an operating class identified by an operating class A.

It may be understood that in Embodiment 2 of this application, an AP in the AP MLD is used as an example for description. In actual application, each AP in the AP MLD may perform step S201 to step S202 shown in FIG. 9.

It may be understood that the second STA may be a single-link STA, or may be a STA in a non-AP MLD. When the second STA is a single-link STA, when the second STA switches from one link to another link for working, the second STA may obtain a specific critical BSS parameter by using the method in this embodiment of this application.

It can be learned that, in this embodiment of this application, a second frame sent by the AP in the AP MLD not only explicitly carries specific critical BSS parameters of a plurality of APs in the AP MLD, but also explicitly carries specific critical BSS parameters of a plurality of APs in another AP MLD. The specific critical BSS parameter includes an element related to a channel change. This may help the non-AP MLD learn working channel switching statuses of all APs in the AP MLD in time when the non-AP MLD listens to one or more links (not all the links), so that the non-AP MLD can work normally.

In an optional embodiment, when the STA in the non-AP MLD requests to switch to another link for working, channel switching signaling implicitly indicates to request, from the AP MLD, a specific critical BSS parameter of an AP working on the link. Alternatively, specific signaling is explicitly carried to indicate a specifically required critical BSS parameter. For example, one or more element IDs are used. Optionally, one or more element ID extensions are further carried. Alternatively, a non-inherited element in the 802.11-2016 protocol is directly reused to obtain a parameter of a corresponding element in the non-inherited element. A response frame with which the associated AP MLD replies on the link corresponding to the STA needs to carry a latest special specific BSS parameter of an AP working on the another link at this time.

Optionally, the channel switching signaling further includes an identifier of the AP, for example, a link identifier; and an identifier of the MLD including the AP, for example, a sequence number of the MLD or a MAC address of the MLD.

FIG. 12 is a schematic diagram of a frame structure of a non-inherited element according to an embodiment of this application. As shown in FIG. 12, the non-inherited element includes an element ID, a length, an element ID extension, one or more element IDs, and one or more element ID extensions. The element ID and the element ID extension are used to indicate that the element is the non-inherited element. The length indicates a length after an element length field. Optionally, the one or more element IDs, and the one or more element ID extensions are used to indicate content of requested one or more specific elements. An element ID extension number also exists only when a value of the element ID is 255. Otherwise, the element ID may independently indicate an element.

The foregoing content describes in detail the methods provided in this application. To better implement the foregoing solutions in embodiments of this application, embodiments of this application further provide corresponding apparatuses or devices.

In embodiments of this application, functional modules in the multi-link device may be defined based on the foregoing method examples. For example, each functional module may be defined in a correspondence to each function, or two or more functions may be integrated in one processing module. The integrated module may be implemented in a form of hardware, or may be implemented in a form of a software functional module. It should be noted that, in the embodiments of this application, division into the modules is an example, and is merely logical function division. In an actual implementation, another division manner may be used. The following describes in detail communication apparatuses in embodiments of this application with reference to FIG. 13 to FIG. 17. The communication apparatus is an access point in an access point multi-link device or a station in a non-access point multi-link device. Further, the communication apparatus may be an apparatus in an AP MLD, or an apparatus in a non-AP MLD.

When an integrated unit is used, FIG. 13 is a schematic diagram of a structure of a communication apparatus 1 according to an embodiment of this application. The communication apparatus 1 may be a first AP MLD or a chip in a first AP MLD, for example, a Wi-Fi chip, or may be a first AP in a first AP MLD or a chip in a first AP. The first AP is a reporting AP, and belongs to the first AP MLD. As shown in FIG. 13, the communication apparatus 1 includes a processing unit 11 and a transceiver unit 12.

The processing unit 11 is configured to generate a first frame, where the first frame indicates critical BSS parameter update information respectively corresponding to a plurality of APs in a first AP MLD and critical BSS parameter update information respectively corresponding to a plurality of APs in a second AP MLD. The second AP MLD is an AP MLD to which a nontransmitted AP belongs in a multiple BSSID set including a first AP, and one piece of critical BSS parameter update information corresponding to an AP is used to determine whether a critical BSS parameter in a BSS managed by the AP is updated. The transceiver unit 12 is configured to send the first frame on a link on which the communication apparatus 1 works.

Optionally, the critical BSS parameter update information includes a critical BSS parameter update count value.

It can be learned that in the communication apparatus 1, the first frame generated by the processing unit 11 cannot only indicate critical BSS parameter update count values corresponding to the plurality of APs in the first AP MLD, but also indicate critical BSS parameter update count values corresponding to the plurality of APs in the second AP MLD. This implements that one AP helps a plurality of APs in another AP MLD to indicate corresponding critical BSS parameter update count values, so that a STA can compare a currently received critical BSS parameter update count value with a critical BSS parameter update count value received last time, and check whether a critical BSS parameter is updated. Therefore, the STA can be assisted in receiving a latest critical BSS parameter, and a non-AP MLD associated with the second AP MLD can listen on a link on which a nontransmitted AP in the second AP MLD works, and can also work normally.

Optionally, the processing unit 11 is further configured to generate a second frame, where the second frame indicates specific critical BSS parameters of a plurality of APs in the first AP MLD and specific critical BSS parameters of a plurality of APs in the second AP MLD. The transceiver unit 12 is further configured to send the second frame on a link on which the communication apparatus 1 works.

It should be understood that the communication apparatus 1 may correspondingly perform Embodiment 1, and the foregoing operations or functions of the units in the communication apparatus 1 are separately used to implement corresponding operations of the first AP in the first AP MLD in Embodiment 1. For brevity, details are not described herein again.

FIG. 14 is a schematic diagram of a structure of a communication apparatus 2 according to an embodiment of this application. The communication apparatus 2 may be a first STA or a chip in a first STA, for example, a Wi-Fi chip. The first STA may be a single-link STA, or may be a STA in a non-AP MLD. As shown in FIG. 14, the communication apparatus 2 includes a transceiver unit 21 and a processing unit 22.

The transceiver unit 21 is configured to receive a first frame on a link on which the communication apparatus 2 works, where the first frame indicates critical BSS parameter update information respectively corresponding to a plurality of APs in the first AP MLD and critical BSS parameter update information respectively corresponding to a plurality of APs in a second AP MLD. The second AP MLD is an AP MLD to which a nontransmitted AP belongs in a multiple BSSID set including the first AP, and one piece of critical BSS parameter update information corresponding to an AP is used to determine whether a critical BSS parameter in a BSS managed by the AP is updated. The processing unit 22 is configured to determine, based on the first frame, whether critical BSS parameters of a plurality of BSSs managed by a plurality of APs in an AP MLD associated with the communication apparatus 2 are updated.

Optionally, the critical BSS parameter update information includes a critical BSS parameter update count value.

It can be learned that in the communication apparatus 2, the processing unit 22 may learn, based on the critical BSS parameter update count value indicated by the first frame, whether the BSS to which the processing unit 22 belongs is updated with a critical BSS parameter, to ensure that the processing unit 22 can receive a latest critical BSS parameter.

Optionally, the transceiver unit 21 is further configured to receive a second frame on a link on which the communication apparatus 2 works, where the second frame indicates specific critical BSS parameters of a plurality of APs in the first AP MLD and specific critical BSS parameters of a plurality of APs in the second AP MLD. The processing unit is 22 configured to parse the second frame to obtain specific critical BSS parameters of a plurality of APs in an AP MLD associated with the communication apparatus 2.

It should be understood that the communication apparatus 2 may correspondingly perform Embodiment 1, and the foregoing operations or functions of the units in the communication apparatus 2 are separately used to implement corresponding operations of the first STA in the non-AP MLD in Embodiment 1. For brevity, details are not described herein again.

Figure 15:
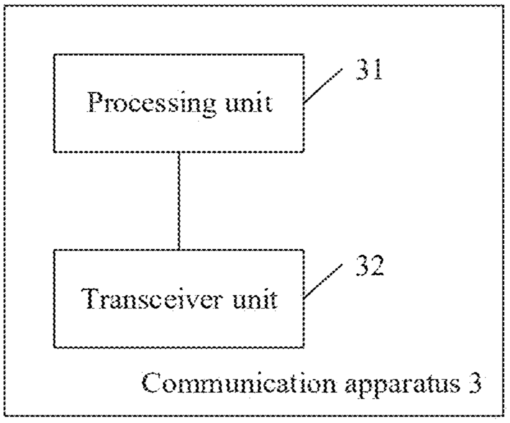
FIG. 15 is a schematic diagram of a structure of a communication apparatus 3 according to an embodiment of this application.

FIG. 15 is a schematic diagram of a structure of a communication apparatus 3 according to an embodiment of this application. The communication apparatus 3 may be a first AP MLD or a chip in a first AP MLD, for example, a Wi-Fi chip, or may be a second AP in a first AP MLD or a chip in a second AP. The second AP is any AP in the first AP MLD. As shown in FIG. 15, the communication apparatus 3 includes a processing unit 31 and a transceiver unit 32.

The processing unit 31 is configured to generate a second frame, where the second frame indicates specific critical BSS parameters of a plurality of APs in the first AP MLD and/or specific critical BSS parameters of a plurality of APs in the second AP MLD. The second AP MLD is an AP MLD to which a nontransmitted AP belongs in a multiple BSSID set including the second AP. The transceiver unit 32 is configured to send the second frame on a link on which the communication apparatus 3 works.

It can be learned that, in the communication apparatus 3, the second frame generated by the processing unit 31 not only explicitly carries the specific critical BSS parameters of the plurality of APs in the AP MLD, but also explicitly carries the specific critical BSS parameters of the plurality of APs in another AP MLD. The specific critical BSS parameter includes an element related to a channel change. This may help the non-AP MLD learn working channel switching statuses of all APs in the AP MLD in time when the non-AP MLD listens to one or more links (not all the links), so that the non-AP MLD can work normally.

It should be understood that the communication apparatus 3 described in this embodiment of this application may correspondingly perform Embodiment 2, and the foregoing operations or functions of the units in the communication apparatus 3 are separately used to implement corresponding operations of the second AP in the first AP MLD in Embodiment 2. For brevity, details are not described herein again.

Figure 16:
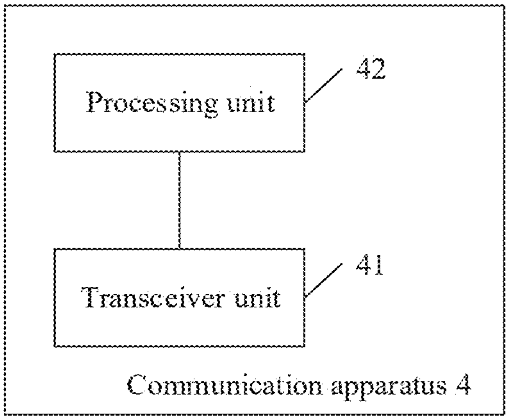
FIG. 16 is a schematic diagram of a structure of a communication apparatus 4 according to an embodiment of this application.

FIG. 16 is a schematic diagram of a structure of a communication apparatus 4 according to an embodiment of this application. The communication apparatus 4 may be a second STA or a chip in a second STA, for example, a Wi-Fi chip. The second STA may be a single-link STA, or may be a STA in a non-AP MLD. As shown in FIG. 16, the communication apparatus 4 includes a transceiver unit 41 and a processing unit 42.

The transceiver unit 41 is configured to receive a second frame on a link on which the communication apparatus 4 works, where the second frame indicates specific critical BSS parameters of a plurality of APs in a first AP MLD and/or specific critical BSS parameters of a plurality of APs in a second AP MLD. The second AP MLD is an AP MLD to which a nontransmitted AP belongs in a multiple BSSID set including the second AP. The processing unit 42 is configured to parse the second frame to obtain specific critical BSS parameters of a plurality of APs in an AP MLD associated with the second STA.

It can be learned that in the communication apparatus 4, the processing unit 42 parses the second frame to learn a latest critical BSS parameter of the plurality of APs in an AP MLD associated with an MLD on which the processing unit 42 is located, and may perform corresponding processing based on the received latest critical BSS parameter, to ensure normal communication.

It should be understood that the communication apparatus 4 described in this embodiment of this application may correspondingly perform Embodiment 2, and the foregoing operations or functions of the units in the communication apparatus 4 are separately used to implement corresponding operations of the second STA of the non-AP MLD in Embodiment 2. For brevity, details are not described herein again.

The foregoing describes the AP MLD and the STA in embodiments of this application. The following describes possible product forms of the AP MLD and the STA. It should be understood that any form of product that has the function of the AP MLD in FIG. 13 or FIG. 15 and any form of product that has the function of the STA in FIG. 14 or FIG. 16 fall within the protection scope of embodiments of this application. It should be further understood that the following description is merely an example, and product forms of the AP MLD and the STA in embodiments of this application are not limited thereto.

As a possible product form, the AP MLD and the STA described in embodiments of this application may be implemented by using a general bus architecture.

Figure 17:
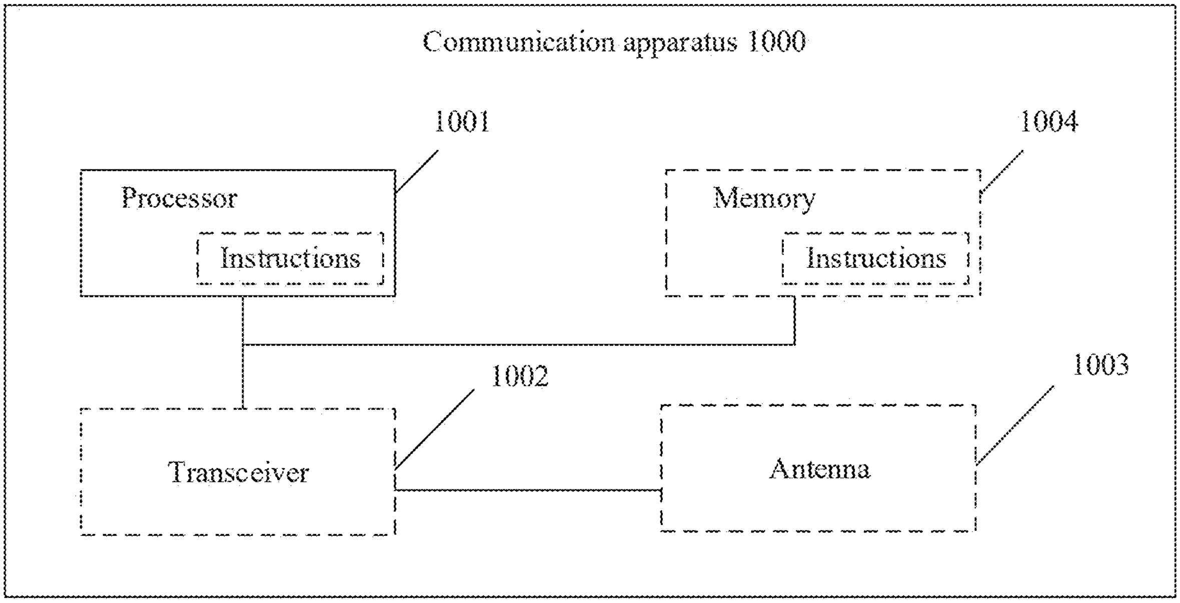
FIG. 17 is a schematic diagram of a structure of a communication apparatus 1000 according to an embodiment of this application.

FIG. 17 is a schematic diagram of a structure of a communication apparatus 1000 according to an embodiment of this application. The communication apparatus 1000 may be an AP MLD, a STA, or an apparatus in an AP MLD or a STA. As shown in FIG. 17, the communication apparatus 1000 includes a processor 1001 and a transceiver 1002 that is internally connected to and communicates with the processor. The processor 1001 is a general-purpose processor, a dedicated processor, or the like. For example, the processor may be a baseband processor or a central processing unit. The baseband processor may be configured to process a communication protocol and communication data, and the central processing unit may be configured to control a communication apparatus (for example, a base station, a baseband chip, a terminal, a terminal chip, a DU, or a CU) to execute a computer program, to process data of the computer program. The transceiver 1002 may be referred to as a transceiver unit, a transceiver, a transceiver circuit, or the like, and is configured to implement a transceiver function. The transceiver 1002 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function. Optionally, the communication apparatus 1000 may further include an antenna 1003 and/or a radio frequency unit (not shown in the figure). The antenna 1003 and/or the radio frequency unit may be located inside the communication apparatus 1000, or may be separated from the communication apparatus 1000. In other words, the antenna 1003 and/or the radio frequency unit may be deployed remotely or in a distributed manner.

Optionally, the communication apparatus 1000 may include one or more memories 1004. The memory 1004 may store instructions. The instructions may be a computer program. The computer program may be run on the communication apparatus 1000, so that the communication apparatus 1000 performs the method described in the foregoing method embodiments. Optionally, the memory 1004 may further store data. The communication apparatus 1000 and the memory 1004 may be separately disposed, or may be integrated.

The processor 1001, the transceiver 1002, and the memory 1004 may be connected through a communication bus.

In a design, the communication apparatus 1000 may be configured to perform a function of the first AP in the first AP MLD in the foregoing Embodiment 1. The processor 1001 may be configured to perform step S101 in FIG. 7 and/or another process of the technology described in this specification. The transceiver 1002 may be configured to perform step S102 in FIG. 7 and/or another process of the technology described in this specification.

In a design, the communication apparatus 1000 may be configured to perform a function of the first STA of the non-AP MLD in Embodiment 1. The processor 1001 may be configured to perform step S104 in FIG. 7 and/or another process of the technology described in this specification. The transceiver 1002 may be configured to perform step S103 in FIG. 7 and/or another process of the technology described in this specification.

In a design, the communication apparatus 1000 may be configured to perform a function of the second AP in the first AP MLD in Embodiment 2. The processor 1001 may be configured to perform step S201 in FIG. 9 and/or another process of the technology described in this specification. The transceiver 1002 may be configured to perform step S202 in FIG. 9 and/or another process of the technology described in this specification.

In a design, the communication apparatus 1000 may be configured to perform a function of the STA of the non-AP MLD in Embodiment 2. The processor 1001 may be configured to perform step S204 in FIG. 9 and/or another process of the technology described in this specification. The transceiver 1002 may be configured to perform step S203 in FIG. 9 and/or another process of the technology described in this specification.

In any one of the foregoing designs, the processor 1001 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated. The transceiver circuit, the interface, or the interface circuit may be configured to read and write code/data. Alternatively, the transceiver circuit, the interface, or the interface circuit may be configured to transmit or transfer a signal.

In any one of the foregoing designs, the processor 1001 may store instructions. The instruction may be a computer program. The computer program is run on the processor 1001, so that the communication apparatus 1000 can perform the method described in the foregoing method embodiments. The computer program may be fixed in the processor 1001, and in this case, the processor 1001 may be implemented by hardware.

In an implementation, the communication apparatus 1000 may include a circuit, and the circuit may implement a sending, receiving, or communication function in any one of the foregoing method embodiments. The processor and the transceiver described in this application may be implemented in an integrated circuit (integrated circuit, IC), an analog IC, a radio frequency integrated circuit RFIC, a mixed-signal IC, an application-specific integrated circuit (application-specific integrated circuit, ASIC), or a printed circuit board (printed circuit board, PCB), an electronic device, and the like. The processor and the transceiver may be manufactured by using various IC technologies, for example, a complementary metal oxide semiconductor (complementary metal oxide semiconductor, CMOS), an N-type metal oxide semiconductor (nMetal-oxide-semiconductor, NMOS), a P-type channel metal oxide semiconductor (positive channel metal oxide semiconductor, PMOS), a bipolar junction transistor (bipolar junction transistor, BJT), a bipolar CMOS (BiCMOS), silicon germanium (SiGe), and gallium arsenide (GaAs).

A scope of the communication apparatus described in this application is not limited thereto, and a structure of the communication apparatus may not be limited by FIG. 17. The communication apparatus may be an independent device or may be a part of a large device. For example, the communication apparatus may be:

(1) an independent integrated circuit IC, a chip, or a chip system or subsystem;
(2) a set including one or more ICs, where optionally, the IC set may further include a storage component configured to store data and a computer program;
(3) an ASIC, for example, a modem (Modem);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or
(6) another device or the like.

In a possible product form, the AP MLD and the STA in embodiments of this application may be implemented by a general-purpose processor.

The general-purpose processor for implementing the AP MLD includes a processing circuit and an input/output interface internally connected to and communicating with the processing circuit.

In a design, the general-purpose processor may be configured to perform a function of the first AP in the first AP MLD in the foregoing Embodiment 1. Specifically, the processing circuit is configured to perform step S101 in FIG. 7 and/or another process of the technology described in this specification. The input/output interface is configured to perform step S102 in FIG. 7 and/or another process of the technology described in this specification.

In another design, the general-purpose processor may be configured to perform a function of the second AP in the first AP MLD in the foregoing Embodiment 2. Specifically, the processing circuit is configured to perform step S201 in FIG. 9 and/or another process of the technology described in this specification. The input/output interface is configured to perform step S202 in FIG. 9 and/or another process of the technology described in this specification.

The general-purpose processor for implementing the non-AP MLD includes a processing circuit and an input/output interface internally connected to and communicating with the processing circuit.

In a design, the general-purpose processor may be configured to perform a function of the first STA of the non-AP MLD in the foregoing Embodiment 1. Specifically, the processing circuit is configured to perform step S104 in FIG. 7 and/or another process of the technology described in this specification. The input/output interface is configured to perform step S103 in FIG. 7 and/or another process of the technology described in this specification.

In another design, the general-purpose processor may be configured to perform a function of the second STA of the non-AP MLD in the foregoing Embodiment 2. Specifically, the processing circuit is configured to perform step S204 in FIG. 9 and/or another process of the technology described in this specification. The input/output interface is configured to perform step S203 in FIG. 9 and/or another process of the technology described in this specification.

As a possible product form, the AP MLD or the STA described in this embodiment of this application may further be implemented by using the following components: one or more FPGAs (field programmable gate arrays), a PLD (programmable logic device), a controller, a state machine, gate logic, a discrete hardware component, any other suitable circuit, or any combination of circuits that can perform various functions described in this application.

It should be understood that the communication apparatuses in the foregoing various product forms have any function of the AP MLD or the STA in the method embodiments. Details are not described herein again.

An embodiment of this application further provides a computer-readable storage medium. The computer-readable storage medium stores computer program code. When the processor executes the computer program code, an electronic device performs the method in any one of the foregoing embodiments.

An embodiment of this application further provides a computer program product. When the computer program product runs on a computer, the computer is enabled to perform the method in any one of the foregoing embodiments.

An embodiment of this application further provides a communication apparatus. The apparatus may exist in a product form of a chip. A structure of the apparatus includes a processor and an interface circuit. The processor is configured to communicate with another apparatus through the interface circuit, to enable the apparatus to perform the method in any one of the foregoing embodiments.

An embodiment of this application further provides a wireless communication system, including a first AP MLD and a STA. The first AP MLD and the STA may perform the method in any one of the foregoing embodiments.

Method or algorithm steps described in combination with the content disclosed in this application may be implemented by hardware, or may be implemented by a processor by executing software instructions. The software instructions may include a corresponding software module. The software module may be stored in a random access memory (Random Access Memory, RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium, where the communication medium includes any medium that facilitates transmission of a computer program from one place to another. The storage medium may be any available medium accessible to a general-purpose or a special-purpose computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A method applicable to multiple links, the method comprising:

generating, by a first access point (AP) in a first access point multi-link device (AP MLD), a first frame comprising:
a multi-link (ML) element, and
a reduced neighbor report (RNR) element; and
sending, by the first AP in the first AP MLD, the first frame on a link on which the first AP works;
wherein:
the ML element comprises an MLD common information field that carries a critical basic service set (BSS) parameter update count value of the first AP and a link identifier of the first AP,
the RNR element comprises a plurality of instances of a target beacon transmission time (TBTT) information field,
each instance of the TBTT information field comprises:
one critical basic service set (BSS) parameter update count value,
one link identifier field, and
one multi-link device (MLD) ID field;
wherein the one link identifier field together with the one MLD ID field indicates that the critical BSS parameter update count value corresponds to a reported AP of an AP MLD,
wherein the reported AP is indicated by the one link identifier field, and
wherein the AP MLD is indicated by the one MLD ID field;
one instance of a respective reported AP indicated by one instance of the one link identifier field together with one instance of the one MLD ID field in one instance of the TBTT information field is an AP of a plurality of APs other than the first AP in the first AP MLD,
another instance of another respective reported AP indicated by another instance of the one link identifier field together with another instance of the one MLD ID field in another instance of the TBTT information field is an AP of a plurality of APs in a second AP MLD;
the second AP MLD is an AP MLD to which a nontransmitted AP belongs, and
the nontransmitted AP is in a multiple basic service set identifier (BSSID) set comprising the first AP.

2. The method according to claim 1, wherein the critical BSS parameter update count value is increased by 1 in accordance with a change to one or more of the critical BSS parameters.

3. The method according to claim 1, wherein the first frame is any frame taken from the group consisting of: a beacon frame, a probe response frame, and an association response frame.

4. The method according to claim 1, wherein an association response frame sent by the first AP in the first AP MLD carries current critical BSS parameter update count values of the plurality of APs in the first AP MLD or the plurality of APs in the second AP MLD.

5. The method according to claim 1, wherein the method further comprises:

generating, by the first AP in the first AP MLD, a second frame, wherein the second frame indicates specific critical BSS parameters of the plurality of APs in the first AP MLD and specific critical BSS parameters of the plurality of APs in the second AP MLD; and
sending, by the first AP in the first AP MLD, the second frame on the link on which the first AP works.

6. The method according to claim 5, wherein the critical BSS parameter update comprises one or more of the following:

an inclusion of a channel switch announcement element, an inclusion of an extended channel switch announcement element, a modification of an enhanced distributed channel access (EDCA) parameters element, an inclusion of a quiet element, a modification of a direct-sequence spread spectrum (DSSS) parameter set, a modification of a contention free (CF) parameter set element, a modification of a high throughput (HT) operation element, an inclusion of a wide bandwidth channel switch element, an inclusion of a channel switch wrapper element, an inclusion of an operating mode notification element, an inclusion of a quiet channel element, a modification of a very high throughput (VHT) operation element, a modification of a high efficient (HE) operation element, an insertion of a broadcast target wake time (TWT) element, an inclusion of a BSS color change announcement element, a modification of multi-user EDCA (MU EDCA) parameter set element, and a modification of a spatial reuse parameter set element; and wherein one of the specific critical BSS parameters comprises one or more of the following: an inclusion of a channel switch announcement element, an inclusion of an extended channel switch announcement element, an inclusion of a wide bandwidth channel switch element, and an inclusion of a channel switch wrapper element.

7. A communication apparatus, comprising:

a transceiver;

at least one processor; and at least one memory coupled to the at least one processor and storing programming instructions for execution by the at least one processor and causing the communications apparatus to carry out a method applicable to multiple links, the method comprising:

generating a first frame comprising:

a multi-link (ML) element, and a reduced neighbor report (RNR) element; and sending, by a first AP in a first AP multi-link device (MLD), the first frame on a link on which the first AP works;

wherein:

the ML element comprises an MLD common information field that carries a critical basic service set (BSS) parameter update count value of the first AP and a link identifier of the first AP, the RNR element comprises a plurality of instances of a target beacon transmission time (TBTT) information field, each instance of the TBTT information field comprises:

one critical basic service set (BSS) parameter update count value, one link identifier field, and one multi-link device (MLD) ID field;

wherein the one link identifier field together with the one MLD ID field indicates that the critical BSS parameter update count value corresponds to a reported AP of an AP MLD, wherein the reported AP is indicated by the one link identifier field, and wherein the AP MLD is indicated by the one MLD ID field;

one instance of a respective reported AP indicated by one instance of the one link identifier field together with one instance of the one MLD ID field in one instance of the TBTT information field is an AP of a plurality of APs other than the first AP in the first AP MLD, another instance of another respective reported AP indicated by another instance of the one link identifier field together with another instance of the one MLD ID field in another instance of the TBTT information field is an AP of a plurality of APs in a second AP MLD;

the second AP MLD is an AP MLD to which a nontransmitted AP belongs, and the nontransmitted AP is in a multiple basic service set identifier (BSSID) set comprising the first AP.

8. The communication apparatus according to claim 7, wherein the critical BSS parameter update count value is increased by 1 in accordance with a change to one or more of the critical BSS parameters.

9. The communication apparatus according to claim 7, wherein a value of a short service set identifier (SSID) field of an AP in the RNR element is obtained based on an SSID of an MLD including the AP.

10. The communication apparatus according to claim 7, wherein the first frame is any frame taken from the group consisting of: a beacon frame, a probe response frame, and an association response frame.

11. The communication apparatus according to claim 7, wherein an association response frame sent by an AP in the first AP MLD carries current critical BSS parameter update count values of the plurality of APs in the first AP MLD or the plurality of APs in the second AP MLD.

12. The communication apparatus according to claim 7, wherein the method further comprises:

generating, by the first AP in the first AP MLD, a second frame, wherein the second frame indicates specific critical BSS parameters of the plurality of APs in the first AP MLD and specific critical BSS parameters of the plurality of APs in the second AP MLD; and sending, by the first AP in the first AP MLD, the second frame on the link on which the first AP works.

13. The communication apparatus according to claim 12, wherein the critical BSS parameter update comprises one or more of the following:

an inclusion of a channel switch announcement element, an inclusion of an extended channel switch announcement element, a modification of an enhanced distributed channel access (EDCA) parameters element, an inclusion of a quiet element, a modification of a direct-sequence spread spectrum (DSSS) parameter set, a modification of a contention free (CF) parameter set element, a modification of a high throughput (HT) operation element, an inclusion of a wide bandwidth channel switch element, an inclusion of a channel switch wrapper element, an inclusion of an operating mode notification element, an inclusion of a quiet channel element, a modification of a very high throughput (VHT) operation element, a modification of a high efficient (HE) operation element, an insertion of a broadcast target wake time (TWT) element, an inclusion of a BSS color change announcement element, a modification of multi-user EDCA (MU EDCA) parameter set element, and a modification of a spatial reuse parameter set element; and wherein one of the specific critical BSS parameters comprises one or more of the following: an inclusion of a channel switch announcement element, an inclusion of an extended channel switch announcement element, an inclusion of a wide bandwidth channel switch element, and an inclusion of a channel switch wrapper element.

14. A first access point multi-link device (AP MLD) including a first AP and a second AP, the first AP comprising:

a transceiver;

at least one processor; and at least one memory coupled to the at least one processor and storing programming instructions for execution by the at least one processor and causing the first AP to carry out a method applicable to multiple links, the method comprising:

generating a first frame comprising:

a multi-link (ML) element, and a reduced neighbor report (RNR) element; and sending, by a first AP in a first AP multi-link device (MLD), the first frame on a link on which the first AP works;

wherein:

the ML element comprises an MLD common information field that carries a critical basic service set (BSS) parameter update count value of the first AP and a link identifier of the first AP, the RNR element comprises a plurality of instances of a target beacon transmission time (TBTT) information field, each instance of the TBTT information field comprises:

one critical basic service set (BSS) parameter update count value, one link identifier field, and one multi-link device (MLD) ID field;

wherein the one link identifier field together with the one MLD ID field indicates that the critical BSS parameter update count value corresponds to a reported AP of an AP MLD, wherein the reported AP is indicated by the one link identifier field, and wherein the AP MLD is indicated by the one MLD ID field;

one instance of a respective reported AP indicated by one instance of the one link identifier field together with one instance of the one MLD ID field in one instance of the TBTT information field is an AP of a plurality of APs other than the first AP in the first AP MLD, another instance of another respective reported AP indicated by another instance of the one link identifier field together with another instance of the one MLD ID field in another instance of the TBTT information field is an AP of a plurality of APs in a second AP MLD;

the second AP MLD is an AP MLD to which a nontransmitted AP belongs, and the nontransmitted AP is in a multiple basic service set identifier (BSSID) set comprising the first AP.

15. The first AP MLD according to claim 14, wherein an association response frame sent by the first AP in the first AP MLD carries current critical BSS parameter update count values of the plurality of APs in the first AP MLD or the plurality of APs in the second AP MLD.

16. The first AP MLD according to claim 14, wherein the critical BSS parameter update count value is increased by 1 in accordance with a change to one or more of the critical BSS parameters.

17. The first AP MLD according to claim 14, wherein the first frame is any frame taken from the group consisting of: a beacon frame, a probe response frame, and an association response frame.

18. The first AP MLD according to claim 14, wherein the method further comprises:

generating, by the first AP in the first AP MLD, a second frame, wherein the second frame indicates specific critical BSS parameters of the plurality of APs in the first AP MLD and specific critical BSS parameters of the plurality of APs in the second AP MLD; and sending, by the first AP in the first AP MLD, the second frame on the link on which the first AP works.

19. The first AP MLD according to claim 18, wherein the critical BSS parameter update comprises one or more of the following:

an inclusion of a channel switch announcement element, an inclusion of an extended channel switch announcement element, a modification of an enhanced distributed channel access (EDCA) parameters element, an inclusion of a quiet element, a modification of a direct-sequence spread spectrum (DSSS) parameter set, a modification of a contention free (CF) parameter set element, a modification of a high throughput (HT) operation element, an inclusion of a wide bandwidth channel switch element, an inclusion of a channel switch wrapper element, an inclusion of an operating mode notification element, an inclusion of a quiet channel element, a modification of a very high throughput (VHT) operation element, a modification of a high efficient (HE) operation element, an insertion of a broadcast target wake time (TWT) element, an inclusion of a BSS color change announcement element, a modification of multi-user EDCA (MU EDCA) parameter set element, and a modification of a spatial reuse parameter set element; and wherein one of the specific critical BSS parameters comprises one or more of the following: an inclusion of a channel switch announcement element, an inclusion of an extended channel switch announcement element, an inclusion of a wide bandwidth channel switch element, and an inclusion of a channel switch wrapper element.

* * * * *